(12) United States Patent
Nishimoto et al.

(10) Patent No.: US 8,051,678 B2
(45) Date of Patent: Nov. 8, 2011

(54) PRESS MOLDING METHOD FOR MANUFACTURING OF GLASS SUBSTRATE

(75) Inventors: Shiro Nishimoto, Itami (JP); Mitsugu Tokunaga, Hyogo-Ken (JP); Hideki Kawai, Nishinomiya (JP); Toshiharu Mori, Settsu (JP); Shinji Fukumoto, Nara (JP)

(73) Assignee: Minolta Co., Ltd., Osaka (JP)

( * ) Notice: Subject to any disclaimer, the term of this patent is extended or adjusted under 35 U.S.C. 154(b) by 1417 days.

(21) Appl. No.: 10/825,178

(22) Filed: Apr. 16, 2004

(65) Prior Publication Data
US 2004/0194508 A1 Oct. 7, 2004

Related U.S. Application Data

(62) Division of application No. 10/212,144, filed on Aug. 6, 2002, now abandoned.

(30) Foreign Application Priority Data

Aug. 8, 2001 (JP) ................................. 2001-240741
Aug. 8, 2001 (JP) ................................. 2001-240746
Aug. 29, 2001 (JP) ................................. 2001-259840

(51) Int. Cl.
*C03B 21/00* (2006.01)
(52) U.S. Cl. .................... 65/105; 65/63; 65/66; 65/102; 65/104; 65/33.9; 65/61; 65/65
(58) Field of Classification Search ............... 65/63–66, 65/386, 102–104, 33.1, 105, 33.9, 61; 360/135; 428/64.1, 64.2, 64.4, 66.6, 140
See application file for complete search history.

(56) References Cited

U.S. PATENT DOCUMENTS

| 5,474,807 | A | 12/1995 | Koshiishi |
| 5,774,265 | A | 6/1998 | Mathers et al. |
| 6,096,445 | A | 8/2000 | Terakado et al. |
| 6,314,764 | B1* | 11/2001 | Sakamoto .................. 65/374.12 |
| 6,442,975 | B1* | 9/2002 | Murakami et al. ................ 65/61 |
| 6,537,648 | B1 | 3/2003 | Takahashi et al. |
| 6,539,750 | B1* | 4/2003 | Takagi et al. ..................... 65/64 |
| 6,620,748 | B1 | 9/2003 | Sugimoto et al. |

(Continued)

FOREIGN PATENT DOCUMENTS

JP 7-133121 5/1995

(Continued)

OTHER PUBLICATIONS

Derwent Abstract to JP patent 2000-90619, Meguro, Disk-Shaped Recording Medium and Disk Cartridge, Mar. 31, 2000.*

(Continued)

*Primary Examiner* — Queenie Dehghan
(74) *Attorney, Agent, or Firm* — McDermott Will & Emery LLP

(57) ABSTRACT

The present invention relates to a glass substrate of which the outer periphery portion is unprocessed. The present invention also relates to a manufacturing method for a glass substrate of which the outer periphery portion is unprocessed, characterized in that a first lapping process, a second lapping process, a polishing process and a washing process are carried out after a press molding process is carried out so as to compress glass between an upper mold and a lower mold without regulating the edge surface of the outer periphery portion of the glass and, then, a crystallization process or an annealing process is carried out.

2 Claims, 16 Drawing Sheets

U.S. PATENT DOCUMENTS

| | | | |
|---|---|---|---|
| 6,627,566 B1* | 9/2003 | Zou | 501/5 |
| 2001/0041271 A1* | 11/2001 | Watanabe et al. | 428/694 SG |
| 2002/0054976 A1* | 5/2002 | Nakamura et al. | 428/66.6 |
| 2002/0139145 A1* | 10/2002 | Murakami | 65/102 |
| 2003/0109370 A1* | 6/2003 | Ikenishi et al. | 501/66 |

FOREIGN PATENT DOCUMENTS

| | | | |
|---|---|---|---|
| JP | 11-016151 | | 1/1999 |
| JP | 11-116261 | | 4/1999 |
| JP | 11-255524 | | 9/1999 |
| JP | 2000090619 A | * | 3/2000 |
| JP | 2000182316 A | * | 6/2000 |
| JP | 2000-281371 | | 10/2000 |
| JP | 2001-019468 | | 1/2001 |
| JP | 2001-026459 | | 1/2001 |
| JP | 2001-163626 | | 6/2001 |
| JP | 2001-229526 | | 8/2001 |
| JP | 2001273661 A | * | 10/2001 |
| JP | 2002-100025 | | 4/2002 |

OTHER PUBLICATIONS

Philips, Compact Disc with Optically Recorded Signal Tracks Consists of Two Identical Discs Joined Together to Make Double-sided Recording, Oct. 16, 1987, Derwent Patent Abstract of NL 8600728.*

English translation of Japanese Office Action issued in Japanese Patent Application No. 2001-259840, mailed Mar. 31, 2009.

* cited by examiner (A)

(B)

(A)

(B)

(A)

(B)

(A)

(B)

(A)

(B)

(C)

(A)

(B)

PRESS MOLDING METHOD FOR MANUFACTURING OF GLASS SUBSTRATE

This application is a divisional of Application Serial No. 10/212,144 filed Aug. 6, 2002 now abandoned.

This application is based on applications No. 240741/2001, No. 240746/2001 and No. 259840/2001 filed in Japan, the contents of which are herein incorporated by reference.

BACKGROUND OF THE INVENTION

1. Field of the Invention

The present invention relates to a press molding method for glass and to a manufacturing method for a glass substrate using this method.

The present invention also relates to molded glass, for example, to a glass substrate, in particular, to a glass substrate of which the outer periphery portion is unprocessed and to a glass substrate provided with a center hole, as well as to manufacturing methods for the above.

2. Description of the Related Art

A type of hard disk utilized as an information recording medium of a computer wherein a base layer, a recording layer and a protective layer are sequentially layered on the surface (including the outer periphery edge surface) of a disk-shaped substrate made of glass is known and is utilized by rotation, having the center of this disk-shaped substrate as the center of rotation. The outer periphery portion of such a glass substrate is processed with precision and the center hole of a glass substrate of a hard disk provided with a center hole is created so that the center of the center hole becomes center of the hard disk.

A manufacturing method for a glass substrate of a hard disk is briefly described using the flow chart of FIG. 18. First, glass material is melted (glass melting step), the melted glass is made to flow into a lower mold and press molding is carried out by means of an upper mold (press molding step). In the press molding step, methods such as are shown in FIGS. 16 and 17 are generally adopted. In FIG. 16, simple press molding is carried out on glass material 103 so that it attains a predetermined thickness utilizing an upper mold 101 and a lower mold 102 provided with molding surfaces having planar forms (Japanese unexamined patent publication H11 (1999)-255524). In FIG. 17, press molding is carried out on glass material 108 when an outer diameter regulating frame 107, in a ring form, is intervened between an upper mold 105 and a lower mold 106 provided with molding surfaces having planar forms. In the method shown in FIG. 17, according to a detailed description, the outer periphery edge surface of glass material 108 contacts outer diameter regulating frame 107, in a ring form, at the time of press molding so that the outer diameter of the glass substrate is regulated (Japanese unexamined patent publication H7 (1995)-133121).

The glass material (glass substrate) on which press molding has been carried out is crystallized or annealed and, then, is cooled (crystallization step or annealing step). A hole is created, if desired, in the center portion of the cooled glass substrate through cutting and, after that, the outer periphery edge portion of the glass substrate, at least, is cut so that the dimensions of the outer diameter and the circularity of the glass substrate are pre-adjusted (coring step or outer periphery pre-processing step). The glass substrate, of which the dimensions of the outer diameter, or the like, have been pre-adjusted, undergoes the first lapping process wherein the two surfaces are polished so that the entire form of the glass substrate, that is to say, the parallelism, the flatness and the thickness of the glass substrate, is pre-adjusted (first lapping step). The outer periphery edge surface, at least, and the inner periphery edge surface of the hole in the glass substrate, if desired, of the glass substrate, of which the parallelism, and the like, are pre-adjusted, are polished or rounded so that the dimensions of the outer diameter and the circularity of the glass substrate, the dimensions of the inner diameter of the hole, as well as the concentricity of the glass substrate and the hole, are microscopically adjusted (precision edge surface processing step (inner and outer)). The outer periphery edge surface, at least, and the inner periphery edge surface of the hole, if desired, of the glass substrate, of which the dimensions of the outer diameter, or the like, have been microscopically adjusted, are polished so that the edge surfaces are made to have a mirror surface (edge surface polishing process (inner and outer)). The two surfaces of the glass substrate, of which the edge surfaces have been polished, are again polished so that the entire form of the glass substrate, that is to say, the parallelism, the flatness and the thickness of the glass substrate, is microscopically adjusted (second lapping step). The glass substrate, of which the parallelism, and the like, has been microscopically adjusted, undergoes the polishing step so that the two surfaces are polished and the unevenness of the surfaces is eliminated (polishing step). The glass substrate, which has been polished, is finally washed and inspected so that only those that have passed inspection can be utilized as substrates for hard disks.

According to conventional methods there is a limit to the degree of the mirror surface of the outer periphery edge surface although mirror surfaces can be achieved on the top surface and on the bottom surface of the glass substrate. That is to say, even though the outer periphery portion of the glass substrate is processed as described above, in particular, even though the outer periphery edge surface of the glass substrate is polished in the edge surface polishing step according to the conventional methods, the outer periphery edge surface cannot be sufficiently converted to a mirror surface because this process for the edge surface is complex and because polishing of this edge surface cannot be carried out for sufficiently long period of time due to manufacturing cost considerations. Described in detail, microscopic scratches remain in the outer periphery edge surface of the glass substrate gained according to the conventional methods so that the surface has a surface coarseness of at least approximately 5 nm and a maximum surface coarseness of approximately 250 nm. When microscopic scratches remain in the outer periphery edge surface in such a manner, it is difficult to layer a base layer, a recording layer, a protective layer, and the like, on top of these microscopic scratches. In addition, even in the case that a base layer, a recording layer, a protective layer, and the like, can be layered on top of the microscopic scratches, the amount of alkaline components exuding out of these microscopic scratches significantly increases as time elapses and, therefore, a base layer, a recording layer, a protective layer, and the like, which have been layered onto the surfaces (including the outer periphery edge surface) are corroded from the outer periphery portion of the substrate at a comparatively early stage so that a problem arises, as a consequence, wherein the stored data is destroyed comparatively easily.

In addition, as for a cutting method in the coring step in the case that a glass substrate of a hard disk provided with a center hole is manufactured, inner and outer diameter processing by means of polishing, a method wherein scribing is carried out on at least one surface of a glass substrate and, then, an impact is given to the portion to be cut in the condition wherein this scribed surface is facing upward (Japanese unexamined patent publication H11 (1999)-116261), a method of dividing a glass substrate by cutting shallow lines into the glass substrate by means of a laser beam (for example, Japanese unexamined patent publication 2000-281371), and the like, are generally adopted. According to the conventional methods, however, a hole is created in a glass substrate, of which the two surfaces are flat through their entirety, in the coring step by means of the above described cutting methods and, therefore, there is the problem of increased cost of manufacture because processing time becomes too lengthy, the utilized devices are too expensive and the processes are too complex.

Furthermore, according to the conventional methods, the precision of the press molding step is particularly poor so that it becomes necessary to adjust the entire form of a glass substrate by means of the above described lapping step, or the like, and because the number of steps is great an increase in the cost of manufacture has become a problem. That is to say, according to the method shown in FIG. 16, the thickness of a glass substrate is controlled according to the distance between the upper mold and the lower mold and, therefore, it is difficult to gain a glass substrate having a predetermined thickness. Furthermore, when glass substrates are repeatedly manufactured, one axis, of the center axis of the upper mold of the center axis of the lower mold, easily becomes tilted relative to the other axis so that the parallelism is deteriorated. In addition, according to the method shown in FIG. 17, glass makes contact with the entirety of the upper mold, the lower mold and the outer diameter regulating frame at the time of press molding and, therefore, a slight increase in the amount of glass prevents pressure from being uniformly conveyed to the glass so that the parallelism and the flatness easily become deteriorated. In addition, when molding is repeatedly carried out, a great dispersion in thickness results.

SUMMARY OF THE INVENTION

The present invention is formed of the following inventions A to C.

A purpose of invention A is to provide a glass substrate of a hard disk that can be simply manufactured at a low cost and of which the outer periphery edge surface is sufficiently converted to a mirror surface and to provide a manufacturing method for the same.

A purpose of invention B is to provide a method for manufacturing, simply and at a low cost, a glass substrate of a hard disk provided with a center hole.

A purpose of invention C is to provide a press molding method for glass having a high precision with respect to the parallelism, the flatness and the dispersion in thickness and to provide a manufacturing method for a glass substrate of a hard disk that can reduce the manufacturing cost by reducing the number of manufacturing steps.

Invention A relates to a glass substrate of a hard disk of which the outer periphery portion is unprocessed.

Invention A also relates to a manufacturing method for a glass substrate of a hard disk, of which the outer periphery portion is unprocessed, characterized in that a press molding process is carried out on glass between an upper mold and a lower mold without regulating the edge surface of the outer periphery portion of the glass and a first lapping process, a second lapping process, a polishing process and a washing process are carried out after a crystallization process or after an annealing process.

Invention A also relates to a manufacturing method for a glass substrate of a hard disk, of which the outer periphery portion is unprocessed, characterized in that a press molding process is carried out on glass between an upper mold and a lower mold without regulating the edge surface of the outer periphery portion of the glass and a center of gravity coring process is carried out in order to create a center hole, of which the center is the center of gravity, and then a first lapping process, a precision inner periphery edge surface process, an inner periphery edge surface polishing process, a second lapping process, a polishing process and a washing process are carried out after a crystallization process or after an annealing process.

Invention B relates to a manufacturing method for a glass substrate of a hard disk provided with a center hole characterized by being created in a manner wherein a press molding process for compressing glass is carried out so as to gain a glass substrate having a recessed portion, which has been compressed by a protruding portion, wherein the thickness D of the glass becomes 0.1 T1 to 0.5 T1 (T1 is the distance between the molding surface of the upper mold and the molding surface of the lower mold at the time of the completion of the press molding process) by compressing the glass between the upper and lower molds, the molding surface of one of the upper and lower molds having the protruding portion in the form of a circular truncated cone formed by cutting a cone with a plane parallel to the bottom surface of the cone wherein the ratio (B/A), of the diameter B of the top cross section to the diameter A of the bottom surface, is 0.7 to 0.99 and, after that, a lapping process is carried out on, at least, the surface of this glass substrate without the recessed portion.

Invention C relates to a press molding method for glass characterized in that glass is compressed between an upper mold and a lower mold with a parallel spacer intervened between the upper mold and the lower mold while the outer periphery portion of the glass and the parallel spacer maintain the non-contact condition.

Invention C also relates to a manufacturing method for a glass substrate of a hard disk wherein the above described press molding method is adopted.

DETAILED DESCRIPTION OF THE PREFERRED EMBODIMENTS

Figure 1:
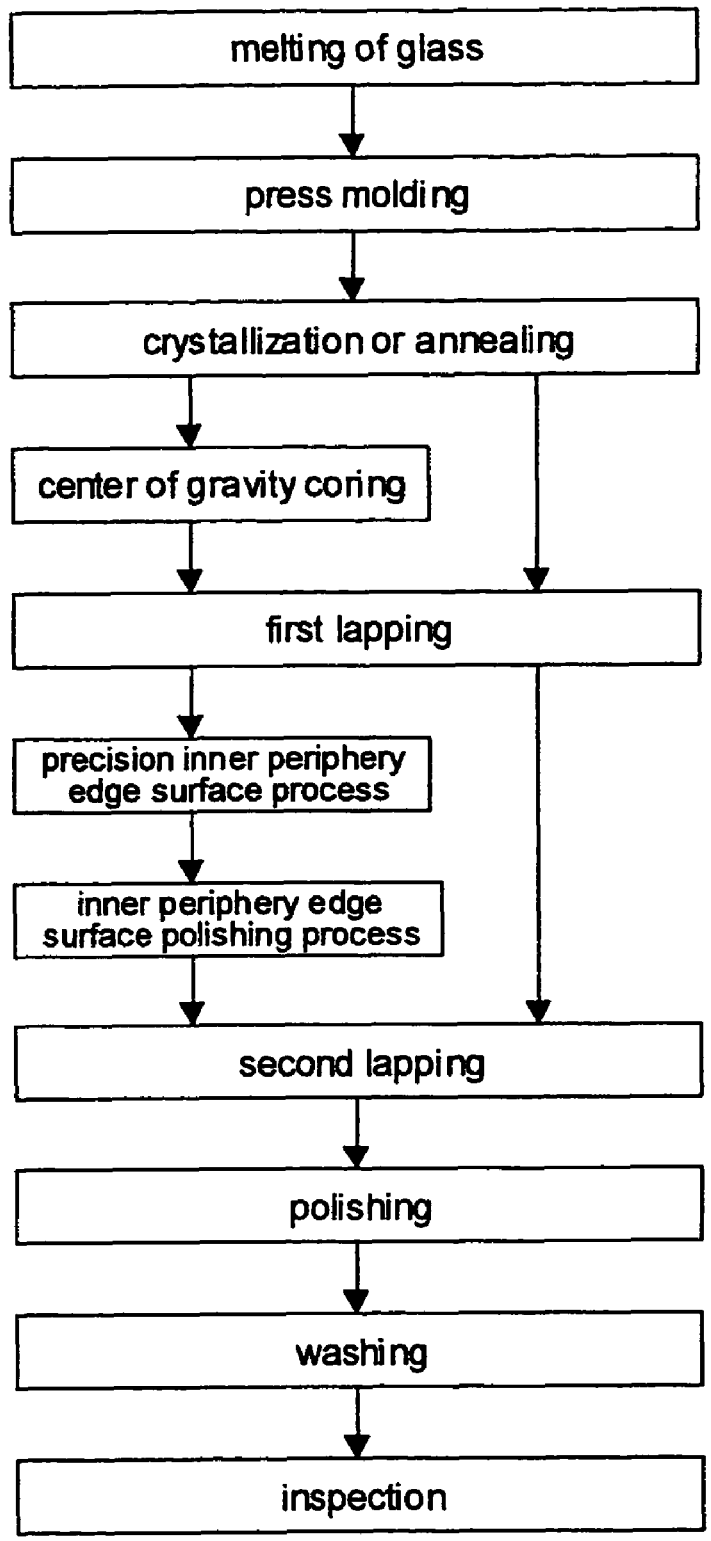
FIG. 1 is a flow chart of one example of a manufacturing method for a glass substrate of a hard disk, of which the outer periphery portion is unprocessed according to invention A.

In the present specification, parallelism is an index representing the degree of "tilt of the surface (top surface), according to transfer from the molding surface of the upper mold, relative to the surface (bottom surface), according to transfer from the molding surface of the lower mold" caused by one axis, either the center axis of the upper mold or the center axis of the lower mold, which is tilted relative to the other axis. The tilt of the top surface relative to the bottom surface is a "tilt of the top surface when the bottom surface is regarded as a horizontal plane" and the parallelism is represented by the difference in height due to the tilt of the top surface per 100 mm unit length of the lower surface in the cross section wherein the above tilt is the greatest. Such parallelism is herein represented by the value measured by a Digimatic indicator (manufactured by Mitutoyo Corporation), however, it is not necessary to use this device for measurement but, rather, any device may be used for measurement, as long as the device can measure the above described parallelism.

The flatness is an index representing the degree of warp of a molded article and is represented by the distance between the highest point on the top surface and a horizontal plane surface when the molded article is placed on the horizontal plane surface. Such flatness is herein represented by the value measured by a Digimatic indicator (manufactured by Mitutoyo Corporation), however, it is not necessary to use this device for measurement but, rather, any device may be used for measurement, as long as the device can measure the above described flatness.

The thickness indicates the thickness of the thinnest portion in the molded article.

The dispersion in thickness is the difference between the average thickness when a plurality of molded articles is molded and the thickness that differs the most from this average thickness.

The thickness is herein represented by the value measured by a Digimatic indicator (manufactured by Mitutoyo Corporation), however, any device may be used for measurement.

The surface coarseness (Ra) is an average value based on JIS B0601. The maximum surface coarseness (Rmax) is the maximum value based on JIS B0601.

Invention A

The inventors of invention A focused on the processing of the outer portion (outer periphery edge portion, outer periphery edge surface) of a conventional glass substrate, that is to say, on the processing of the outer periphery edge portion and of the outer periphery edge surface of a glass substrate in the coring step or in the outer periphery preliminary processing step, in the precision edge surface processing step and in the edge surface polishing step and, then, discovered that the above described purpose of invention A was achieved by omitting these process steps so that the outer periphery edge surface that has been sufficiently converted to a mirror surface is left in an unprocessed state. Though the inventors of invention A faced a new problem wherein a glass substrate gained through the omission of the above described process steps allows the occurrence of surface vibration at the time of rotation because the outer periphery portion is unprocessed, the inventors also discovered that this problem can be solved by making the center of gravity of this glass substrate be the rotational center.

A glass substrate of a hard disk according to invention A has an unprocessed outer periphery portion and has a free-form surface at the outer periphery edge surface. Since the outer periphery edge surface having a free-form surface is left in an unprocessed condition in the glass substrate according to invention A, this outer periphery edge surface may have a mirror surface of excellent precision. That is to say, the free-form surface of the outer periphery edge surface in the glass substrate of invention A has a surface coarseness (Ra) of 2.5 nm, or less, and has a maximum surface coarseness (Rmax) of 150 nm, or less, wherein the smaller are those values, the more preferable they are. The free-form surface of the outer periphery edge surface according to invention A usually has an Ra of 0.1 nm to 2.5 nm, in particular of from 0.1 nm to 2.0 nm, and has an Rmax of 1 nm to 150 nm, in particular of from 1 nm to 100 nm. In the case that Ra exceeds 2.5 nm or in the case that Rmax exceeds 150 nm, the smoothness becomes insufficient and microscopic scratches exist so that it becomes difficult to layer a base layer, a recording layer, a protective layer, and the like, on top of these scratches. In addition, even in the case that a base layer, a recording layer, a protective layer, and the like, can be layered on top of the microscopic scratches, the amount of alkaline components that exude from the microscopic scratches significantly increases as time elapses and, therefore, the base layer, the recording layer, the protective layer, and the like, that have been layered on the surface (including on the outer periphery edge surface) of the glass substrate is corroded starting from the outer periphery portion of the substrate at a comparatively early stage so that the stored data is destroyed comparatively easily.

The free-form surface having the mirror surface of the precision described above may have a radius of curvature approximately one half of the thickness of the glass substrate. It is generally preferable for the thickness of the glass substrate to be 0.2 mm to 2.5 mm.

Since a glass substrate of a hard disk, of which the outer periphery portion is unprocessed, according to invention A has few scratches in the outer periphery edge surface, the amount of alkaline components that exude can be effectively reduced. Though the amount of alkaline components that exude not only depends on the surface precision of the outer periphery edge surface but, also, depends on the size of the glass substrate, depends on the existence and size of the center hole, depends on the solvability (composition) of the glass material, and the like, and, therefore, this amount cannot necessarily be consistently determined, a glass substrate of a hard disk, of which the outer periphery portion is unprocessed, according to invention A having, for example, an outer diameter of 65 mm, a thickness of 0.635 mm, an Ra of 0.5 nm and an Rmax of 5.0 nm on the top and bottom surfaces and a center hole inner diameter of 20 mm and having a glass composition of: 69.0 wt. % of $SiO_2$, 8.5 wt. % of $Al_2O_3$, 2.0 wt. % of MgO, 0.5 wt. % of $TiO_2$, 7.0 wt. % $Li_2O$, 7.0 wt. % of ZnO, 2.5 wt. % of $P_2O_5$ and 3.5 wt. % of $ZrO_2$ achieves an amount of exuded alkaline components of 0.21 $\mu g/cm^2$, or less, and preferably 0.20 $\mu g/cm^2$, or less. A glass substrate that has the same properties as above, except for having a processed outer periphery edge surface, an Ra of the outer periphery edge surface exceeding 2.5 nm and an Rmax exceeding 150 nm, produces an exuded amount of alkaline components of 0.22 $\mu g/cm^2$, or greater, so that it becomes difficult to layer a base layer, and the like, on the surface of this glass substrate (including on the outer periphery edge surface) and so that the base layer, and the like, is corroded starting from the outer periphery portion of the substrate at a comparatively early stage even in the case that the base layer, and the like, can be layered on.

In addition, a glass substrate of a hard disk, of which the outer periphery portion is unprocessed and which does not have a center hole according to invention A, having, for example, an outer diameter of 48 mm, a thickness of 0.381 mm, an Ra of 0.5 nm and an Rmax of 5.0 nm of the top and bottom surfaces as well as having a glass composition of: 64.0 wt. % of $SiO_2$, 5.5 wt. % of $B_2O_3$, 11.5 wt. % of $Al_2O_3$, 5.4 wt. % of $Li_2O$, 4.0 wt. % of $Na_2O$, 9.0 wt. % of $K_2O$, 0.5 wt. % of CaO and 0.1 wt. % of $Ta_2O_5$ achieves an amount of exuded alkaline components of 0.32 $\mu g/cm^2$, or less, and preferably 0.31 $\mu g/cm^2$, or less. A glass substrate that has the same properties as above, except for having a processed outer periphery edge surface, an Ra of the outer periphery edge surface exceeding 2.5 nm and an Rmax exceeding 150 nm, produces an exuded amount of alkaline components of 0.33 $\mu g/cm^2$, or greater, so that it becomes difficult to layer a base layer, and the like, on the surface of this glass substrate (including on the outer periphery edge surface) and so that the base layer, and the like, is corroded starting from the outer periphery portion of the substrate at a comparatively early stage even in the case that the base layer, and the like, can be layered on.

In addition, a glass substrate of a hard disk, of which the outer periphery portion is unprocessed according to invention A, having, for example, an outer diameter of 95 mm, a thickness of 1.270 mm, an Ra of 0.5 nm and an Rmax of 5.0 nm of the top and bottom surfaces, a center hole inner diameter of 25 mm as well as having a glass composition of: 45.0 wt. % of $SiO_2$, 18.0 wt. % of $Al_2O_3$, 19.0 wt. % of MgO, 10.0 wt. % of $TiO_2$, 1.5 wt. % of ZnO, 1.5 wt. % of $P_2O_5$, 3.0 wt. % of $ZrO_2$ and 2.0 wt. % of $Nb_2O_5$ exudes very little alkaline components.

In the present specification, measurements of amounts of exuded alkaline components are carried out according to the following method.

After a glass substrate is immersed in 50 ml of water of a reverse osmosis membrane at 80° C. for twenty four hours, the exuded liquid is analyzed by means of an ICP light emitting analysis device (made by Seiko Instruments Inc.) and, then, the amount of exuded alkaline components per unit area of the substrate is calculated.

A glass substrate of a hard disk, of which the outer periphery portion is unprocessed, according to invention A has a center of gravity of this substrate as the center of rotation. "To have the center of gravity as the center of rotation" means to rotate the glass substrate of a hard disk according to invention A such that the center of gravity of the glass substrate becomes the center of rotation at the time when the hard disk, which uses the glass substrate, is utilized. Described in detail, in the case that a glass substrate of a hard disk according to invention A has a center hole, "to have the center of gravity as the center of rotation" means that the center hole is created so that the center of gravity of this substrate becomes the center of the hole and, in the case that a glass substrate of hard disk according to invention A does not have a center hole, "to have the center of gravity as the center of rotation" means that the rotational axis is linked to the position corresponding to the center of gravity of this substrate. According to invention A the center of gravity of a glass substrate, of which the outer periphery portion is unprocessed, is made to be the center of rotation as described above and, thereby, surface vibration can be prevented even in the case that the outer periphery portion is unprocessed.

In the present specification, the center of gravity means the center of gravity of the form of a glass substrate when this substrate is recognized as a two dimensional plane as viewed from the direction of the thickness and can be automatically detected by carrying out image processing on the two dimensional image in the direction of the thickness of the glass substrate by means of a non-contact optical-type form measurement device (VIVID 900 manufactured by Minolta Co., Ltd.) using a laser beam system.

There is no specific limitation to the outer diameter of a glass substrate according to invention A and, for example, 15 mm to 120 mm is appropriate. This outer diameter is determined according to the amount of melted glass made to flow into the lower mold in the below described manufacturing method and according to the distance (thickness of glass substrate) between the molding surface of the upper mold and the molding surface of the lower mold immediately before the completion of the press molding process. The outer diameter is represented by the average value of the maximum outer diameter and the minimum outer diameter.

In addition, the E/ρ (E is the Young's modulus (GPa) and ρ is the specific gravity) of a glass substrate according to invention A is preferably 27 to 52 from the point of view of prevention of surface violation and from the point of view of increase in productivity and is, more preferably, 29 to 50. Though the value gained by submitting the gained glass substrate of the hard disk to the Young's modulus measurement device (manufactured by Kyoto Electronics Manufacturing Co., Ltd.) is used as the E, this value need not necessarily be measured by the above described device but, rather, any device may be used for measurement as long as the device can make measurements according to the same principle as the above described device. The $\rho$ is a value that can easily be calculated from the weight and volume of the gained glass substrate of a hard disk.

The E is preferably 65 GPa to 160 GPa.

The $\rho$ is preferably 2.2 to 3.3.

In addition, the $\alpha s$ ($\alpha s$ is a linear thermal expansion coefficient in the range of 0° C. to 100° C.) of a glass substrate according to invention A is preferably $40 \times 10^{-7}/°$ C. to $130 \times 10^{-7}/°$ C. from the point of view of effective prevention of surface vibration at the time of utilization and cracking due to change in temperature and is, more preferably, $45 \times 10^{-7}/°$ C. to $125 \times 10^{-7}/°$ C. Though the value gained by submitting the gained glass substrate of a hard disk to a thermal expansion measurement device (manufactured by Rigaku Corporation) is used as the $\alpha s$, it is not necessary to use the above described device for measurement of the value but, rather, any device may be used for measurement as long as the device can make measurements according to the same principle as of the above described device.

In the following, a manufacturing method for a glass substrate of a hard disk, of which the outer periphery portion is unprocessed, according to invention A is described in detail using the flow chart of FIG. 1. The flow chart of FIG. 1 shows the case wherein a glass substrate of a hard disk provided with a center hole is manufactured and the case wherein a glass substrate of a hard disk not having a center hole is manufactured. Described in detail, in the case that a glass substrate of a hard disk provided with a center hole is manufactured, after a crystallization process or an annealing process is carried out, a center of gravity coring process, a first lapping process, a precision inner diameter edge surface process, an inner periphery edge surface polishing process, a second lapping process and a polishing process are, sequentially, carried out on a glass substrate that has been gained by melting glass and by press molding. On the other hand, in the case that a glass substrate of a hard disk not having a center hole is manufactured, after a crystallization process or an annealing process, a first lapping process, a second lapping process and a polishing process are sequentially carried out on a glass substrate that has been gained by melting glass and by press molding. Thus, according to a manufacturing method of invention A, the conventional processing (processing of the outer periphery edge portion and of the outer periphery edge surface of a glass substrate in the coring step or the outer periphery pre-processing step, the precision edge surface processing step and the edge surface polishing step) of the outer periphery portion (outer periphery edge portion, outer periphery edge surface) of a glass substrate can be omitted and, therefore, the manufacturing cost can effectively be reduced.

At the time when a glass substrate for a hard disk of invention A is manufactured, first, glass material is melted (glass melting step), there is no specific limitation to the glass material and, for example, an amorphous glass or crystallized glass material, such as lithium aluminosilicate-based glass, magnesium aluminosilicate-based glass, or the like, or an amorphous glass material such as borosilicate-based glass, may be appropriately selected for use according to the desired mode (crystallized glass or amorphous glass) of a glass substrate to be gained.

It is preferable to use a glass material having the following composition for lithium aluminosilicate-based glass: 65 wt. % to 85 wt. % of $SiO_2$, 3 wt. % to 15 wt. % of $Al_2O_3$, 0 wt. % to 12 wt. % of MgO, 0 wt. % to 10 wt. % of $TiO_2$, 3 wt. % to 12 wt. % of $Li_2O$, 0 wt. % to 10 wt. % of ZnO, 0 wt. % to 5 wt. % of $P_2O_5$ and 0 wt. % to 10 wt. % of $ZrO_2$. The amount of exuded alkaline components, in particular the amount of exuded alkaline components from the outer periphery edge surface, can easily be reduced by using a glass material having the above described composition so that the corrosion of the base layer, the recording layer, the protective layer, and the like, due to the extrusion of alkaline components can effectively be prevented.

It is preferable to use a glass material having the following composition for magnesium aluminosilicate-based glass: 45 wt. % to 60 wt. % of $SiO_2$, 12 wt. % to 25 wt. % of $Al_2O_3$, 12 wt. % to 25 wt. % of MgO, 0 wt. % to 12 wt. % of $TiO_2$, 0 wt. % to 12 wt. % of $Li_2O$, 0 wt. % to 10 wt. % of ZnO, 0 wt. % to 5 wt. % of $P_2O_5$, 0 wt. % to 10 wt. % of $ZrO_2$, 0 wt. % to 5 wt. % of $Nb_2O_5$, 0 wt. % to 5 wt. % of $Ta_2O_5$ and 0 wt. % to 5 wt. % of $Y_2O_3$. The amount of exuded alkaline components, in particular the amount of exuded alkaline components from the outer periphery edge surface, can easily be reduced by using a glass material having the above described composition so that the corrosion of the base layer, the recording layer, the protective layer, and the like, due to the extrusion of alkaline components can effectively be prevented. Furthermore, a glass substrate having an E/p within the above described range can easily be gained so that surface vibration, and the like, can be effectively prevented.

It is preferable to use a glass material having the following composition for borosilicate-based glass: 50 wt. % to 69 wt. % of $SiO_2$, 0 wt. % to 15 wt. % of $B_2O_3$, 4 wt. % to 25 wt. % of $Al_2O_3$, 2 wt. % to 7 wt. % of $Li_2O$, 0 wt. % to 14 wt. % of $Na_2O$, 0 wt. % to 18 wt. % of $K_2O$, 0 wt. % to 6 wt. % of CaO, 0 wt. % to 3 wt. % of $Ta_2O_5$, 0 wt. % to 6 wt. % of BaO, 0 wt. % to 6 wt. % of MgO, 0 wt. % to 6 wt. % of SrO, 0 wt. % to 6 wt. % of ZnO. A glass substrate having an $\alpha s$ within the above described range can easily be gained without carrying out a crystallization process by using a glass material having the above described composition so that surface vibration and cracking can be effectively prevented.

Figure 2:
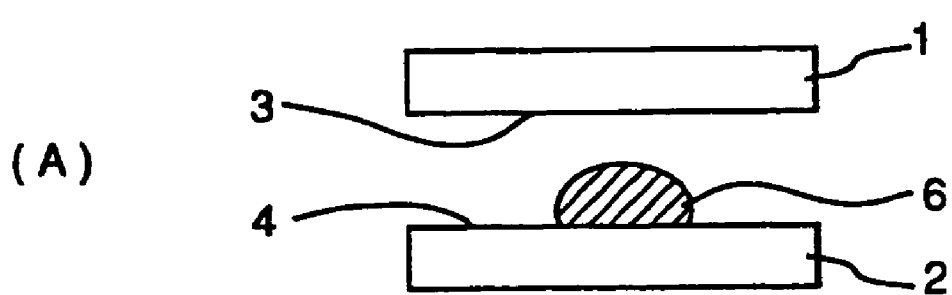
FIG. 2(A) is a schematic configuration diagram, showing upper and lower molds, for describing a manufacturing method for a glass substrate of a hard disk, of which the outer periphery portion is unprocessed according to invention A
FIG. 2(B) is a schematic state diagram of the upper mold and the lower mold after press molding has been carried out using the upper and lower molds of FIG. 2(A)
Figure 2:
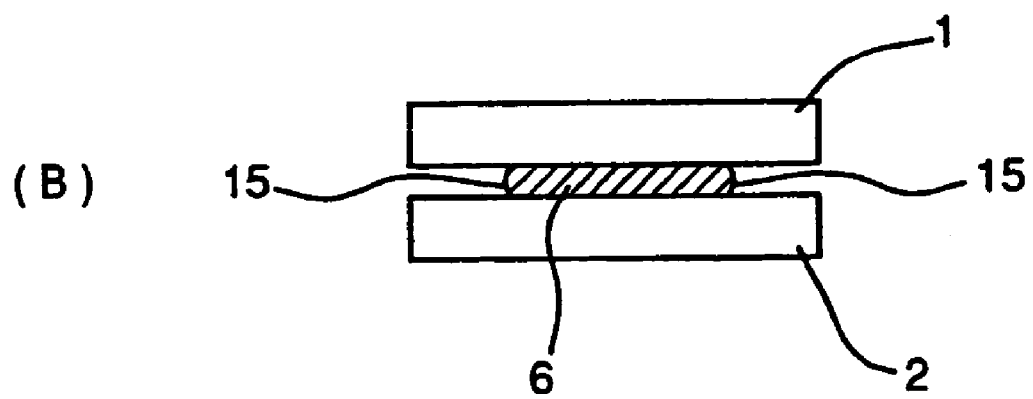

Next, melted glass is made to flow into the lower mold from a nozzle and the glass is compressed between the upper mold and the lower mold without regulating the edge surface of the outer periphery portion of the glass (press molding step). The same method as the method used in the press molding process in a well-known manufacturing method for a glass substrate of a hard disk can be adopted as long as the edge surface of the outer periphery portion of the glass is not regulated, that is to say, the edge surface of the outer periphery portion of the glass does not make any contact with any members. For example, as shown in FIGS. 2(A) and 2(B), glass material 6 is compressed between the upper and lower molds (1, 2), provided with molding surfaces (3, 4) having a plane form, so as to have a predetermined thickness (press molding step). In this step, press molding is carried out wherein the outer periphery edge surface 15 of the glass (see FIG. 15(B)) is not regulated and, therefore, the outer periphery edge surface of the gained glass substrate attains a free-form surface having an excellent mirror surface precision.

The same conditions as of the molding conditions in a well-known manufacturing method for a glass substrate of a hard disk can be adopted for the other molding conditions. For example, a molding pressure of from 20 kg/cm² to 100 kg/cm² and a period of time of pressing of from 0.3 seconds to 2.0 seconds are appropriate.

After the press molding process has been carried out, a crystallization process or an annealing process is usually carried out on the glass substrate, which is, as a result, cooled (crystallization step or annealing step). Whether a crystallization process or an annealing process is carried out depends on the desired mode (crystallized glass or amorphous glass) of the glass substrate to be gained, that is to say, a crystallization process is carried out in the case that a crystallized substrate is desired and an annealing process is carried out in order to remove the internal warp in the case that an amorphous glass is used to gain a substrate.

The same method as the method of a crystallization process or for an annealing process used in a well-known manufacturing method for a glass substrate of a hard disk can be adopted. In a crystallization process, for example, after a glass substrate is heated up to the glass transition point (Tg)+50° C. to Tg+300° C. of the glass material, the glass substrate is generally cooled to a temperature in the vicinity of the glass transition temperature (Tg) of the glass while maintaining a constant temperature or while controlling the temperature and, afterwards, the glass substrate is gradually cooled wherein the heating temperature, the time of maintenance of the temperature, the speed of cooling to Tg, and the like, can be appropriately selected so that the physical properties of the glass substrate, such as coefficient of thermal expansion (coefficient of linear thermal expansion), Young's modulus, degree of crystallization, and the like, are controlled. In an annealing process, after the glass substrate is maintained at a temperature in the vicinity of the Tg of the glass for a constant period of time, the glass substrate is generally cooled to the warp point at a comparatively slow speed of cooling and, afterwards, the glass substrate is cooled at a comparatively high cooling speed. According to invention A, it is preferable to carry out a crystallization process or an annealing process, in particular a crystallization process, while a plurality of glass substrates is being overlapped and pressure is being applied from above by means of a weight, or the like, from the point of view of conservation of space within the processing device and from the point of view of increase in the flatness of glass substrates of hard disks. At this time, it is preferable, from the point of view of prevention of fusing of substrates to each other, to process glass substrates while the glass substrates are being alternately overlapped with setter material units.

Next, a center of gravity coring process and a first lapping process are sequentially carried out (in the case that a glass substrate of a hard disk provided with a center hole is manufactured) or a first lapping process is carried out without carrying out a center of gravity coring process (in the case that a glass substrate of a hard disk not having a center hole is manufactured) on the glass substrate that has been cooled in the crystallization step or in the annealing step.

In the center of gravity coring process that is carried out in the case that a glass substrate of a hard disk provided with a center hole is manufactured, the center hole is created so that the center of gravity of the glass substrate becomes the center. Described in detail, a two dimensional image of the glass substrate as viewed from the direction of the thickness of this substrate is image processed by a non-contact optical-type form measurement device using a laser beam system so that the center of gravity is detected and the center portion in a circular form, of which the center is this center of gravity, is cut out. The same method as the cutting method for creating a center hole in a well-known manufacturing method for a glass substrate of a hard disk can be adopted. For example, a method for precisely processing the inner periphery, a method for scribing by means of a diamond cutter, or the like, along the outline of a desired cutting region in, at least, one surface of a glass substrate and for giving an impact by an impacting body in a desired cutting region under the condition that this surface is facing upwards, a method for cutting an outline of the desired cutting region in a glass substrate by creating a cut by means of a laser beam, and the like, can be cited. According to invention A, a center of gravity coring process is carried out as described above and, therefore, surface vibration in the glass substrate provided with a center hole, of which the outer periphery portion is unprocessed, can be prevented.

Next, a first lapping process is carried out on the glass substrate on which a center of gravity coring process has been carried out (first lapping step) (in the case that a glass substrate of a hard disk provided with a center hole is manufactured). In the case that a glass substrate of a hard disk not having a center hole is manufactured, a first lapping process is carried out on a glass substrate that has been cooled in the crystallization step or in the annealing step. The first lapping step in either of the above described cases is the same and the parallelism, the flatness and the thickness of the glass substrate is pre-adjusted in this step by polishing the two surfaces of the glass substrate. Here, pre-adjustment indicates an approximate adjustment to the degree that the dimensions can be adjusted to the prescribed dimensions in other later steps.

The same method as the method of a first lapping process in a well-known manufacturing method for a glass substrate of a hard disk can be adopted. Described in detail, polishing is carried out using polishing material such as fixed abrasive grains (diamond pellets) or free abrasive grains (slurry of alumina, SiC, or the like) of which the grain size is not less than #600 and not greater than #2000, preferably not less than #800 and not greater than #2000.

A well-known lapping device can be utilized as a lapping device in the first lapping step and, for example, a double-surface lapping device (manufactured by Hamai Company Limited) and a double-surface lapping device (manufactured by SpeedFam, Co., Ltd.) can be cited.

Next, an inner periphery edge surface process (precision inner periphery edge surface process and inner periphery edge surface polishing process) and a second lapping process are sequentially carried out on the glass substrate on which the first lapping process has been carried out (in the case that a glass substrate of a hard disk provided with a center hole is manufactured) or a second lapping process is carried out without carrying out these inner periphery edge surface processes (in the case that a glass substrate of a hard disk not having a center hole is manufactured).

In the precision inner periphery edge surface process carried out in the case that a glass substrate of a hard disk provided with a center hole is manufactured, the inner periphery edge surface, alone, of the center hole in a glass substrate is polished, while the outer periphery edge surface of the glass substrate is not processed, so that the inner diameter dimensions of the center hole and the concentricity of the glass substrate and the hole are microscopically adjusted to the prescribed dimensions and prescribed degree.

The same method as the method for precision edge surface processing in a well-known manufacturing method for a glass substrate of a hard disk can be adopted with the only difference that the surface that becomes the process object is limited to the inner periphery edge surface of the hole. For example, fixed abrasive grains (diamond pellets), free abrasive grains (slurry of alumina, SiC, or the like), or the like, are used as a polishing material so that the inner periphery surface of the hole is polished or the edges of the hole are rounded.

In the inner periphery edge surface polishing process the inner periphery edge surface, alone, of the center hole in the glass substrate is polished so that microscopic scratches are removed while the outer periphery edge surface of the glass substrate is not processed. The reason why the outer periphery edge surface of the glass substrate is not processed is because the outer periphery edge surface of the glass substrate already has a free-form surface with a high precision mirror surface. In the case that the inner periphery edge surface has microscopic scratches, the glass substrate easily breaks in response to impact. The distance between the inner periphery edge surface and the layered recording layer is approximately 1 mm in a hard disk substrate and the corrosion of the base layer, the recording layer, the protective layer, and the like, due to exuded alkaline components from the inner periphery edge surface has not been a problem for an Ra and Rmax at present. Therefore, according to invention A the possibility of destruction of stored data due to the corrosion of the base layer, the recording layer, the protective layer, and the like, can be significantly reduced by just leaving the outer periphery portion unprocessed and by effectively reducing microscopic scratches in the outer periphery edge surface. Accordingly, in this step the microscopic scratches of the inner periphery edge surface may be removed to the degree wherein the glass substrate does not easily break in response to impact.

The same method as the method of the edge surface polishing process in a well-known manufacturing method for a glass substrate of a hard disk can be adopted for the above method for the inner periphery edge surface polishing process with the only difference wherein the surface that becomes the process object is limited to the inner periphery edge surface of the hole. For example, cerium oxide is used as a polishing material the inner periphery edge surface of the hole is polished.

Next, a second lapping process is carried out on the glass substrate on which the inner periphery edge surface polishing process has been carried out (second lapping step) (in the case that a glass substrate of a hard disk provided with a center hole is manufactured). In the case that a glass substrate of a hard disk not having a center hole is manufactured, a second lapping process is carried out on the glass substrate on which the first lapping process has been carried out. The second lapping step in either of the above cases is the same and the two surfaces of a glass substrate are ground so that the form precision of the surfaces is attained (modified) in this step (second lapping step). That is to say, the final quality as a disk (parallelism, flatness and thickness) is achieved and, at the same time, surface coarseness and maximum surface coarseness, which can be adjusted in the below described polishing step, are attained.

The same method as the method of the second lapping process in a well-known manufacturing method for a glass substrate of a hard disk can be adopted. Described in detail, a grinding material such as fixed abrasive grains (diamond pellets), free abrasive grains (slurry of alumina, SiC, or the like), or the like, of which the grains size is not less than #1000 and not greater than #2000, preferably not less than #1200 and not greater than #2000, is used for grinding so that a parallelism of 10 µm, or less, preferably 5 µm, or less, a flatness of 10 µm, or less, preferably 5 µm, or less, a thickness dispersion of ±10 µm, preferably ±5 µm, a surface coarseness (Ra) of 2 µm, or less, preferably 1 µm, or less, and a maximum surface coarseness (Rmax) of 5 µm, or less, preferably 3 µm, or less, are achieved. As a result, in this step, the two surfaces of the glass substrate are generally ground by t/3 to t/20 relative to the thickness t (thickness immediately before this step) in the thickness direction.

The same device illustrated as a lapping device utilized in the first lapping step can be cited as a lapping device utilized in the second lapping step.

Next, the glass substrate on which the lapping process has been carried out is polished so that surface smoothness is attained (adjusted) (polishing step). That is to say, the unevenness of the surface is eliminated so that the final smoothness (surface coarseness, maximum surface coarseness) as a disk is achieved.

The same method as the method of the polishing process in a well-known manufacturing method for a glass substrate of a hard disk can be adopted. Described in detail, a polishing material, such as of cerium oxide, of which the average primary grain diameter is 2 µm, or less, preferably 1 µm, or less, is used for polishing so that a surface coarseness (Ra) of 1 nm, or less, preferably 0.5 nm, or less, a maximum surface coarseness (Rmax) of 20 nm, or less, preferably 10 nm, or less, are achieved. A mirror surface of a high precision can relatively easily by achieved on the top surface and bottom surface of a glass substrate in the above described manner and, therefore, corrosion of the base layer, recording layer, protective layer, and the like, due to microscopic scratches on the top surface and on the bottom surface can relatively easily by prevented. As a result, in this step a glass substrate is generally polished by t/20 to t/500 on the two surfaces relative to the thickness t (thickness immediately before this step) in the thickness direction. In such a polishing step, a "swell" having a swell frequency of L/20, or less, and an amount of swell of M/5, or less, can easily be removed wherein the diameter of the glass substrate is L and the polishing depth per surface in this step is M. Here, the "swell" is a phenomenon wherein a glass surface gently undulates with a specific unit of repetition.

A double-surface polishing board (manufactured by Hamai Company Limited) is, for example, utilized as the polishing device.

Finally, a glass substrate on which a polishing process has been carried out is generally washed and inspected (washing step and inspection step).

Glass dust on the substrate surface may be removed in the washing step by exposing the glass substrate to flowing water at room temperature.

The parallelism, the flatness, the thickness, the surface coarseness, the maximum surface coarseness, the concentricity, the circularity, the form of the edge portion (roll-off), the microscopic swell, and the like, of the substrate are confirmed to be in within desired ranges in the inspection step so that the substrate can be utilized as a substrate of a hard disk.

Figure 3:
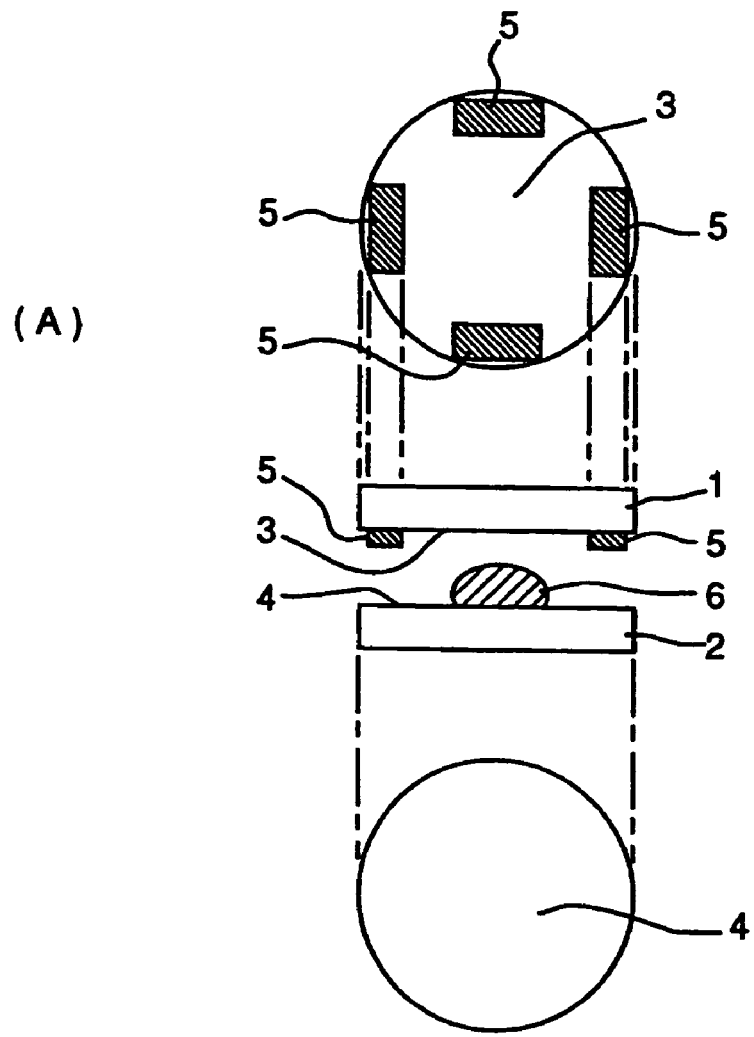
FIG. 3(A) is a schematic configuration diagram, showing upper and lower molds, for describing one example of a method according to inventions A and C
FIG. 3(B) is a schematic state diagram of the upper mold and the lower mold after press molding has been carried out using the upper and lower molds of FIG. 3(A)
Figure 3:
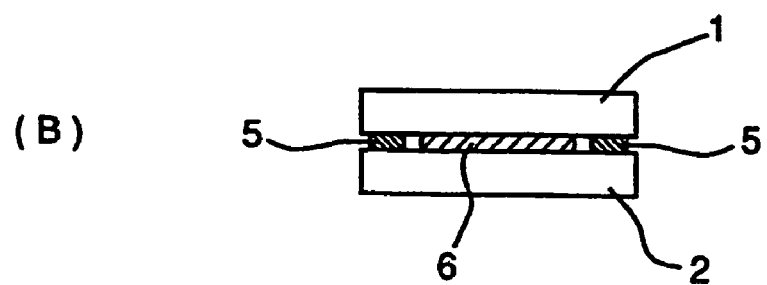

In a manufacturing method for a glass substrate of a hard disk of which the outer periphery portion is unprocessed according to another mode of invention A, it is preferable for a parallel spacer 5 to be intervened between upper mold 1 and lower mold 2 and for the outer periphery portion of the glass and for the parallel spacer to maintain a non-contact condition while the glass is being compressed between the upper mold and the lower mold, as shown in FIG. 3. The parallel spacer has a function of holding the molding surface of the upper mold and the molding surface of the lower mold parallel to each other immediately before the completion of the press molding. The parallelism, the flatness and the precision in regard to thickness dispersion of the gained glass substrate increase by carrying out the above described press molding process. Therefore, the first lapping process that is primarily carried out for the purpose of pre-adjustment of the parallelism, the flatness and the thickness can be omitted. In addition, the period of time of this process can be shortened even in the case wherein the first lapping process is carried out so that the manufacturing cost can be reduced.

Figure 4:
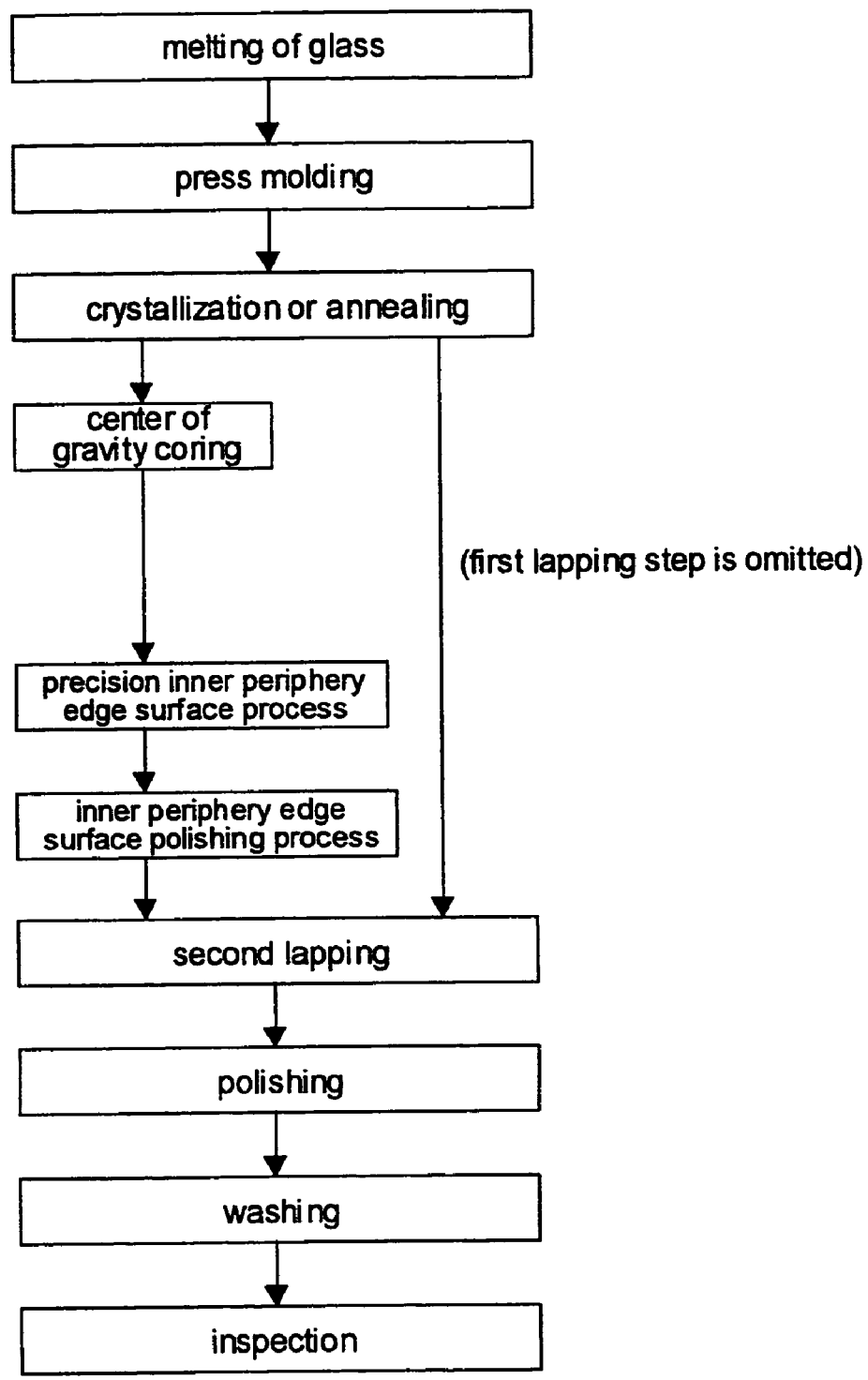
FIG. 4 is a flow chart of an example of a manufacturing method for a glass substrate of a hard disk according to invention A.

The flow chart in the case that the first lapping process is omitted in this mode is shown in FIG. 4. The manufacturing method for a glass substrate of a hard disk of which the outer periphery portion is unprocessed shown in the flow chart of FIG. 4 is the same as the method shown in the above described flow chart of FIG. 1 with the difference that the below described press molding process is carried out so that the first lapping process is omitted and, therefore, descriptions of the parts in common are omitted.

Described in detail, when glass is compressed by moving upper mold 1 and lower mold 2 so as to be close to each other in the press molding step, as shown in, for example, FIGS. 3(A) and 3(B), this movement toward each other is limited by parallel space 5 so as to regulate the thickness of the melted glass 6 (see FIG. 3(B)). At this time, parallel spacer 5 is installed at the outer periphery portion on the molding surface so that the outer periphery portion of the glass and the parallel spacer can maintain the non-contact condition at the time of the press molding (see FIG. 3(B)) and, therefore, the outer periphery portion of the glass does not make contact with parallel spacer 5 so that not only the high mirror surface precision of the outer periphery edge surface but, also, a high precision with respect to the parallelism, the flatness and the thickness dispersion can be achieved. In addition, the molding surfaces of the metal molds can be effectively transferred to the surfaces of the glass substrate. FIG. 3(A) represents a schematic cross sectional diagram of the upper mold and the lower mold provided with a parallel spacer, a schematic layout diagram of the upper mold as seen from below and a schematic layout diagram of the lower mold as seen from above. FIG. 3(B) represents a schematic state diagram of the upper mold and the lower mold when press molding is carried out using the upper mold and the lower mold of FIG. 3(A).

In the device of FIG. 3(A), upper mold 1 and lower mold 2 are provided with molding surfaces 3 and 4, respectively, having plane forms wherein parallel spacer 5 is intervened between upper mold 1 and lower mold 2. Parallel spacer 5 has a spacer function that can hold the molding surfaces of the two molds parallel to each other immediately before the completion of the press molding in the press molding step. Parallel spacer 5 is installed at the outer periphery portion on the molding surface so that the outer periphery portion of the glass and the parallel spacer can maintain the non-contact condition at the time of press molding of melted glass 6 (see FIG. 3(B)).

In FIG. 3(A), though parallel spacer 5 is installed on upper mold 1, it may be installed on lower mold 2. When parallel spacer 5 is installed on upper mold 1, in the case that a plurality of substrates is molded at the same time using a turntable provided with a plurality of lower molds corresponding to one upper mold, the minimum number of parallel spacers may be prepared and the molded article in each of the lower molds can easily be removed after molding has been completed.

In addition, in FIG. 3(A), though parallel spacer 5 has the form of a prism so as to make surface contact with molding surface 4 of the lower mold, the form thereof is not specifically limited as long as it allows the holding of the molding surfaces of the two molds parallel to each other and it may be in, for example, an approximately prismatic form, an approximately columnar form, an approximately pyramidal form, an approximately conical form, an approximately rod-like form or an approximately pin-like form. The parallel spacer makes a dot, line or surface contact with molding surface 4 according to the form thereof, as described above. It is preferable to use a parallel spacer that makes surface contact with the molding surface of the lower mold from the point of view of attaining a molded article with a high precision of parallelism, flatness, thickness, and the like, for a long period of time. The parallel spacer is not excluded from having a ring form as long as it prevents glass and the parallel spacer from making contact with each other at the time of press molding.

In addition, though four parallel spacer 5 are utilized in FIG. 3(A), the number of parallel spacers is not specifically limited as long as the molding surfaces of the two molds can be held parallel to each other and at least two parallel spacers, preferably three parallel spacers, are appropriate in the case that they make surface or line contact with the molding surface of the lower mold and at least three parallel spacers, preferably three parallel spacers, are appropriate in the case that they make dot contact with the molding surface of the lower mold.

It is necessary for the thickness (height) of all of utilized parallel spacers 5 to be strictly the same because the thickness (height) of parallel spacers 5 is reflected in the thickness and the parallelism of the molded article. It is possible to utilize well-known materials that can be utilized for metal molds as the material of parallel spacers 5 and, for example, stainless steel, cemented carbide alloy, cast iron, ceramic, and the like, are cited.

It is possible to utilize well-known materials that have conventionally been utilized for materials of metal molds for glass molding as the material of upper mold 1 and lower mold 2 and, for example, stainless steel, cemented carbide alloy, cast iron, ceramic, and the like, are cited.

In the device of FIG. 3 it is preferable for the surfaces of the parallel spacers that make contact with the upper mold and the lower mold, the surfaces of the upper mold and the lower mold that make contact with the parallel spacers as well as the molding surfaces of the upper mold and the lower mold to have a parallelism of 10 µm, or less, preferably 5 µm, or less, and a flatness of 10 µm, or less, preferably 5 µm, or less, in order to achieve an increase in the precision concerning the parallelism, the flatness and the thickness dispersion. In addition, it is preferable for each of the above described surfaces to have a surface coarseness (Ra) of 3 µm, or less, preferably 1.5 µm, or less, and to have a maximum surface coarseness (Rmax) of 20 µm, or less, preferably 8 µm, or less, from the point of view of gaining the above described glass substrate of a high precision for a long period of time. The thickness (height) of parallel spacers 5 is not specifically limited and it may, for example, be 0.8 mm to 2.0 mm.

When press molding is carried out using such a device, a glass substrate having a precision equal to, or greater than, the precision achieved after the first lapping process has been completed according to a conventional method, that is to say, a parallelism of 20 µm, or less, preferably 10 µm, or less, a flatness of 20 µm, or less, preferably 10 µm, or less, and a thickness dispersion ±10 µm, preferably ±5 µm, can be gained after the crystallization step or after the annealing step. Furthermore, the molding surfaces of the upper mold and the lower mold are effectively transferred to such a glass substrate having a surface coarseness of 3 µm, or less, preferably 1.5 µm, or less, and a maximum surface coarseness of 20 µm, or less, preferably 8 µm, or less. Here, in such a mode, the form precision of setter material units utilized, when desired, in the crystallization step or in the annealing step is generally no smaller than the form precision of the glass substrate to be gained, which is preferably, for example, 5 µm, or less, in flatness.

In a manufacturing method for a glass substrate of a hard disk of which the outer periphery portion is unprocessed according to another mode of invention A, a material having a high rigidity is utilized for the upper mold and the lower mold as well as for the parallel spacers and the precision of these is further enhanced in the above described mode wherein the parallel spacers are used (method shown in the flow chart of FIG. 4). Described in detail, stainless steel, cemented carbide alloy, cast iron, ceramic, and the like, are utilized as a material for the upper mold and the lower mold as well as for the parallel spacers. It is preferable for the surfaces of the parallel spacers that make contact with the upper mold and the lower mold, the surfaces of the upper mold and the lower mold that make contact with the parallel spacers as well as the molding surfaces of the upper mold and the lower mold to have a parallelism of 10 µm, or less, preferably 5 µm, or less, a flatness of 10 µm, or less, preferably 5 µm, or less, a surface coarseness of 1 µm, or less, preferably 0.8 µm, or less and a maximum surface coarseness of 5 µm, or less, preferably 3 µm, or less.

When a press molding process and an annealing process or a crystallization process are carried out using the above described upper mold and lower mold as well as parallel spacers, a glass substrate having the parallelism, the flatness, the thickness dispersion, the surface coarseness and the maximum surface coarseness that have been achieved after the completion of the second lapping step can be gained. Therefore, not only the first lapping process but, also, the second lapping process can be omitted.

Figure 5:
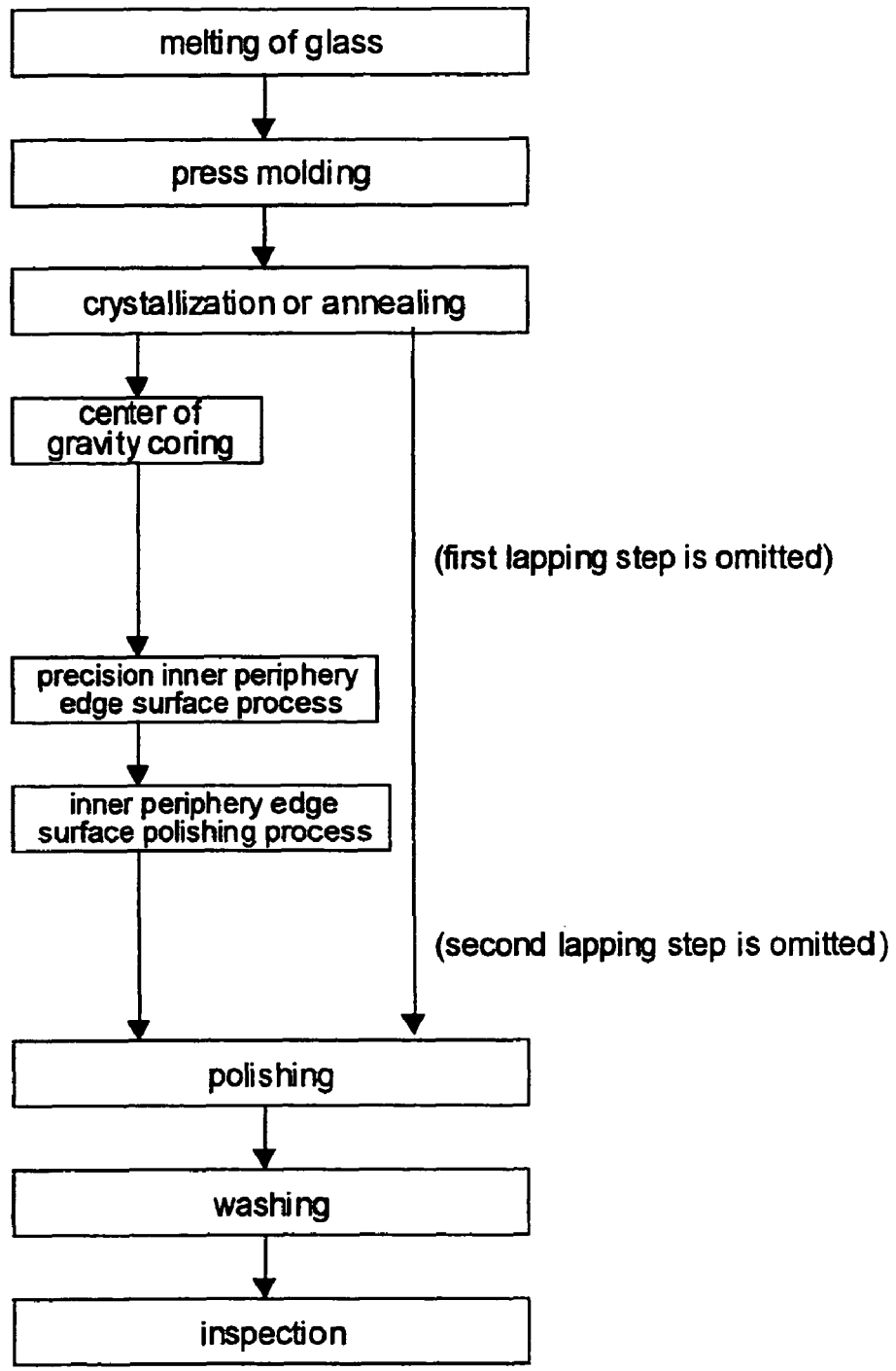
FIG. 5 is a flow chart of an example of a manufacturing method for a glass substrate of a hard disk according to invention A.

The flow chart of this mode is shown in FIG. 5. The manufacturing method for a glass substrate of a hard disk of which the outer periphery portion is unprocessed shown in the flow chart of FIG. 5 is the same method shown in the above described flow chart of FIG. 4 except for the use of the above described upper mold, lower mold and parallel spacers and, therefore, the descriptions thereof are omitted.

In the case that the first and second lapping steps are omitted as described above, the polishing process becomes easier due to, specifically, the further enhancement of the precision of the molding surfaces of the upper mold and of the lower mold. That is to say, when the surface coarseness of the molding surfaces of the upper mold and of the lower mold is made to be 0.8 µm, or less, and the maximum surface coarseness is made to be 3 µm, or less, a glass substrate having a surface coarseness of 0.8 µm, or less, and a maximum surface coarseness of 3 µm, or less, can be gained through the press molding process and the processing time in the polishing step can be shortened.

Figure 6:
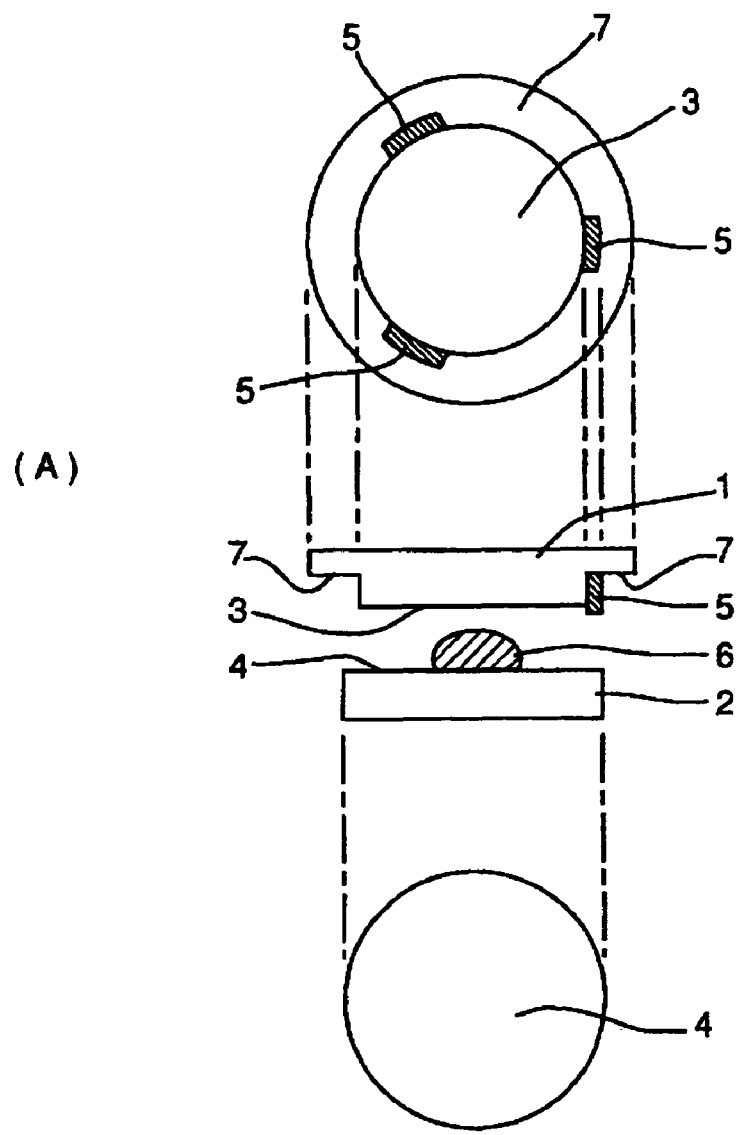
FIG. 6(A) represents a schematic cross sectional diagram showing an example of a press molding device suitable for utilizing methods according to inventions A and C, a schematic layout diagram of the upper mold of this device seen from below and a schematic layout diagram of the lower mold seen from above
FIG. 6(B) is a schematic state diagram of the upper mold and the lower mold after press molding has been carried out using the device of FIG. 6(A)
Figure 6:
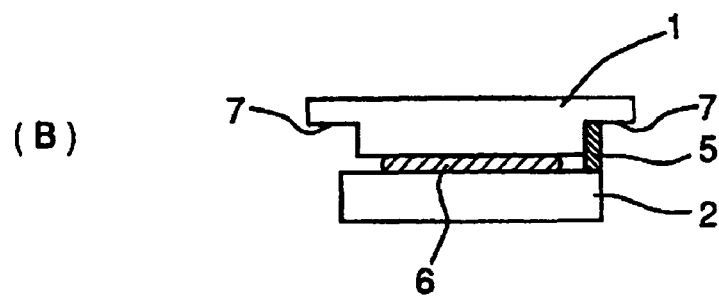
Figure 7:
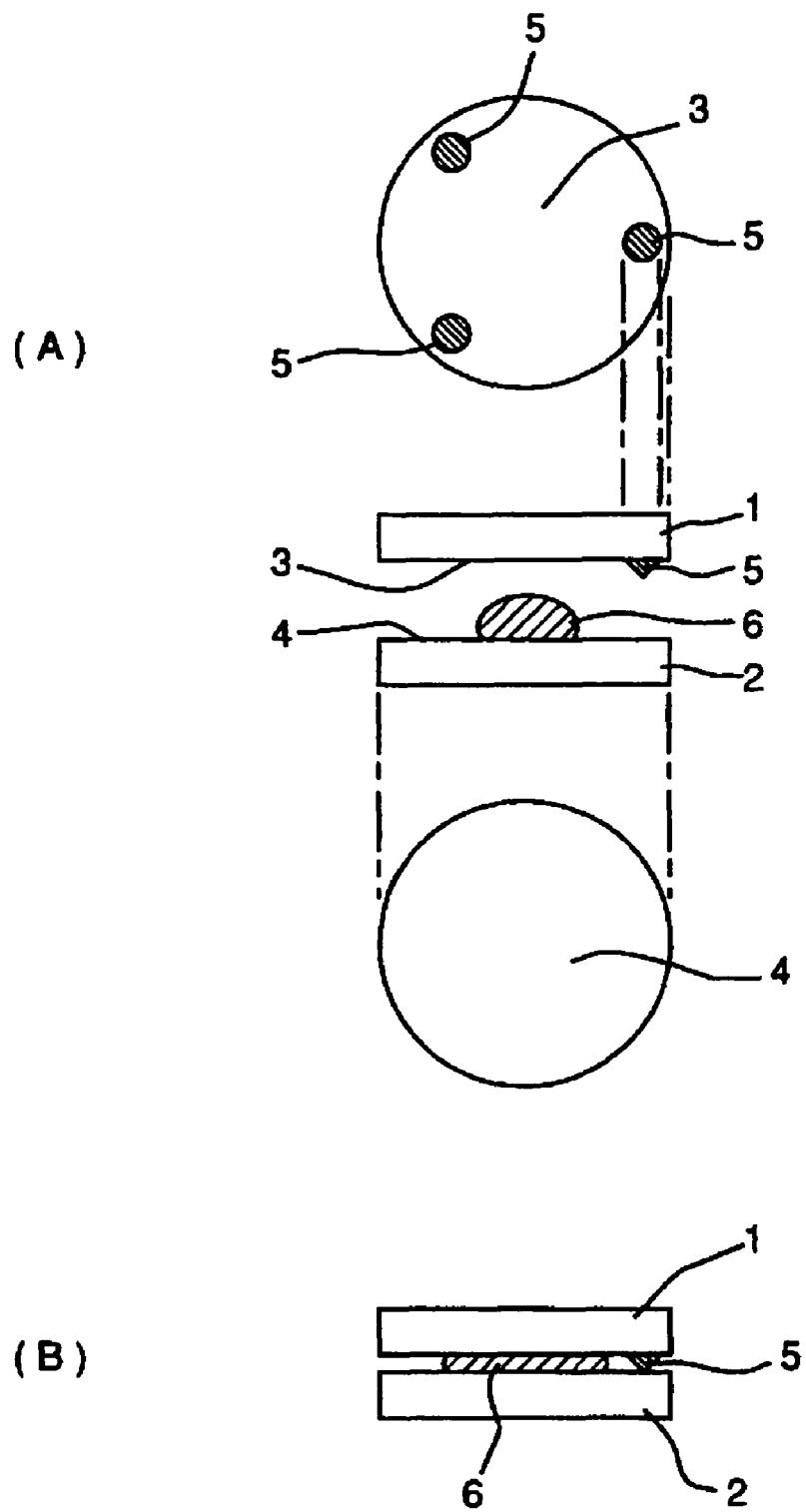
FIG. 7(A) represents a schematic cross sectional diagram showing an example of a press molding device suitable for utilizing methods according to inventions A and C, a schematic layout diagram of the upper mold of this device seen from below and a schematic layout diagram of the lower mold seen from above
FIG. 7(B) is a schematic state diagram of the upper mold and the lower mold after press molding has been carried out using the device of FIG. 7(A)

Here, the devices of FIGS. 6 and 7, for example, in addition to the above described device of FIG. 3 can be utilized as a press molding device suitable for manufacturing a glass substrate of a hard disk of which the outer periphery portion is updated according to invention A in a simple manner at a low cost.

FIG. 6(A) shows a schematic cross sectional diagram of a press molding device, a schematic outline diagram of the upper mold of this device as viewed from below and a schematic outline diagram of the lower mold as viewed from above. FIG. 6(B) shows a schematic state diagram of the upper mold and of the lower mold when press molding is carried out using the device of FIG. 6(A). The device of FIG. 6 is the same device of FIG. 3 with the difference that upper mold 1 has a step 7 and three parallel spacers 5 are installed in this step 7 at equal intervals wherein the form of parallel spacers 5 is an approximately prismatic form and, therefore, the descriptions of this device are omitted. Here, the thickness (height) of parallel spacers 5, in accordance with the description of the device of FIG. 3, corresponds to the thickness (height) of portions of parallel spacers 5 that protrude from molding surface 3 in the axis direction of the molds in FIG. 6.

FIG. 7(A) represents a schematic cross sectional diagram of a press molding device, a schematic outline diagram of the upper mold of this device as viewed from below and a schematic outline diagram of the lower mold as viewed from above. FIG. 7(B) shows a schematic state diagram of the upper mold and of the lower mold when press molding is carried out using the device of FIG. 7(A). The device of FIG. 7 is the same device of FIG. 3 with the difference that three parallel spacers 5 are installed at equal intervals wherein the form of parallel spacers 5 is a conical form and, therefore, the descriptions of this device are omitted.

In a manufacturing method for a glass substrate of a hard disk of which the outer periphery portion is unprocessed according to another mode of invention A, in the case that a glass substrate of a hard disk provided with a center hole is manufactured, "upper and lower molds wherein a protruding portion is provided on one of the molding surfaces of the upper mold and of the lower mold" as described in regard to invention B are used in the press molding step so as to gain a glass substrate having a recess. This is because a hole can be created without a coring process even in the case that a glass substrate of a hard disk provided with a center hole is manufactured by subjecting the surface without a recess, of a glass substrate having a recess, to a lapping process. As a result of this, a glass substrate of a hard disk of which the outer periphery edge surface is sufficiently converted to a mirror surface and that is provided with a center hole can be manufactured more simply and at a low cost.

As described above, the outer periphery portion of a glass substrate of a hard disk according to invention A is unprocessed and the outer periphery edge surface thereof is sufficiently converted to a mirror surface. Therefore, corrosion of the base layer, the recording layer, the protective layer, and the like, that have been layered on top of the surface (including the outer periphery edge surface) of this glass can be prevented for a long period of time. In addition, the center of gravity of the glass substrate of a hard disk of which the outer periphery portion is unprocessed of invention A becomes the center of rotation and, therefore, surface vibration does not occur at the time of rotation. Furthermore, processing of the outer periphery portion, and the like, of the glass substrate of a hard disk of which the outer periphery portion is unprocessed of invention A can be omitted in the manufacturing process thereof and, therefore, the glass substrate can be manufactured simply and at a low cost.

Invention B

According to invention B, a glass substrate having a recess is gained by carrying out a press molding process between upper and lower molds wherein a protruding portion is provided on one of the molding surfaces of the upper and lower molds and, after that, a hole is created by subjecting the surface without the recess of this glass substrate to a lapping process that has been carried out in the conventional manufacturing method. Therefore, the conventional coring process can be omitted and as a result a glass substrate of a hard disk provided with a center hole can be manufactured simply and at a low cost.

Figure 8:
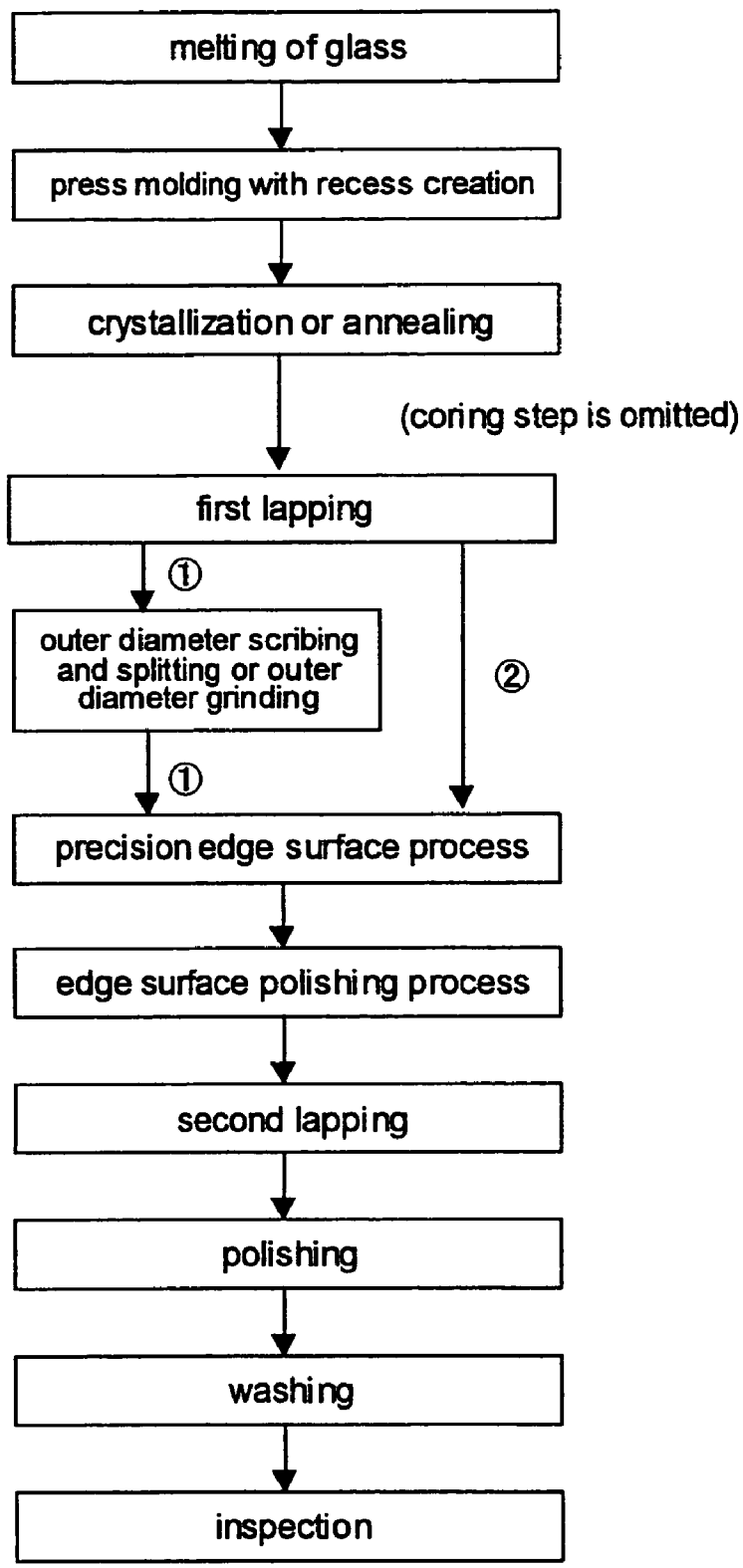
FIG. 8 is a flow chart of one example of a manufacturing method for a glass substrate of a hard disk according to invention B.

The manufacturing method for a glass substrate of a hard disk provided with a center hole according to invention B is described by using the flow chart of FIG. 8. FIG. 8 shows the flow chart that simultaneously represents the first mode ((1)) and the second mode ((2)) of the method according to invention B.

According to invention B, first a glass material is melted (glass melting step). The utilized glass material is not specifically limited and a glass material such as lithium aluminosilicate glass or aluminosilicate glass may be appropriately selected for use according to a desired mode (crystallized glass or amorphous glass) of the glass substrate to be gained. The melting temperature differs depending on the glass material that is utilized and the melted glass may have a viscosity that allows the form of the protruding portion to be effectively transferred in the below described press molding step.

Next the melted glass is made to flow into the lower mold and a press molding process is carried out so that the glass is compressed between the upper and lower molds wherein a specific protruding portion is provided on one of the molding surfaces of the upper and lower molds and, thereby, a glass substrate having a recess is gained (press molding step with recess creation). Though a case is described in the following wherein a press molding process is carried out between the upper and lower molds where a specific protruding portion is provided with the molding surface of the upper mold alone, a press molding process may be carried out between the upper and lower molds where a specific protruding portion is provided with the molding surface of the lower mold alone. In the case that a plurality of substrates is sequentially molded by using a turn table provided with a plurality of lower molds corresponding to one upper mold, it is preferable for the protruding portion to be provided on the molding surface of the upper mold alone from the point of view of reduction of the cost of the device. This is because only one protruding portion is provided and a molded article in a lower mold can be easily taken out after the completion of the molding.

As shown in FIG. 9(A), an upper mold 1 utilized in the press molding step of invention B is provided with a protruding portion 10 at the center of a molding surface 3. Protruding portion 10 has the form of a circular truncated cone gained by cutting a cone, in particular a right circular cone, with a plane parallel to the bottom surface and the bottom surface of the protruding portion is integrated into the molding surface. In protruding portion 10 formed as above, a ratio (B/A) of diameter B of the top surface to diameter A of the bottom surface is 0.7 to 0.99, preferably 0.85 to 0.99, as shown in the enlarged diagram. In the case that the above described ratio is less than 0.7, the inclination of the inner periphery edge surface of the hole is very gradual such that the amount of processing at the time of the precision process of the inner periphery edge surface increases and, thereby, the manufacturing cost increases. In the case that the above described ratio exceeds 0.99, a problem arises such that the upper mold does not easily come off of a molded article after the completion of the press molding.

Though diameter A of the bottom surface of the protruding portion is not specifically limited, it is preferably determined depending on the desired diameter of the glass substrate of a hard disk to be gained and, generally, it is appropriate for A to be 0.2C to 0.4C when this desired diameter is C. C is, in general, 25 mm to 100 mm.

Figure 9:
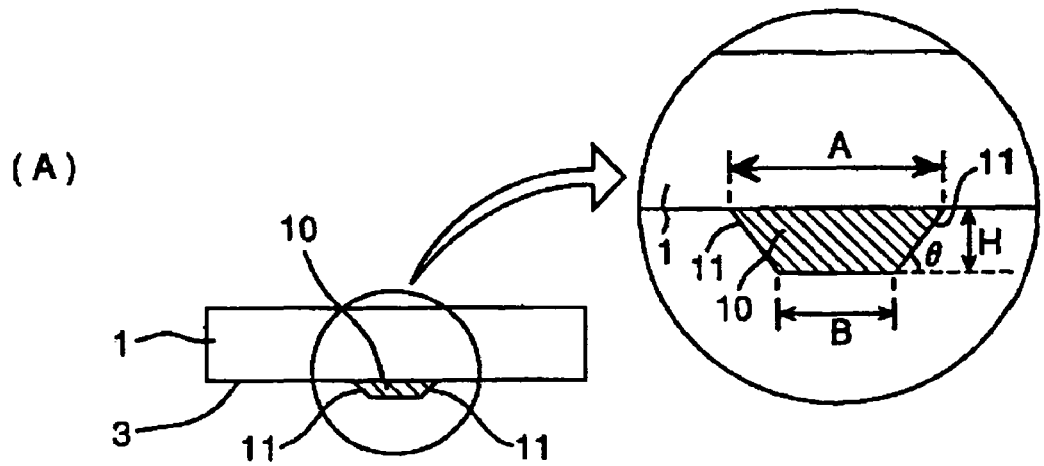
FIG. 9(A) is a schematic configuration diagram, showing upper and lower molds, with an enlarged diagram of a protruding portion for describing a manufacturing method for a glass substrate of a hard disk according to invention B
FIG. 9(B) is a schematic state diagram of the upper mold and the lower mold after press molding has been carried out using the upper and lower molds of FIG. 9(A)
Figure 9:
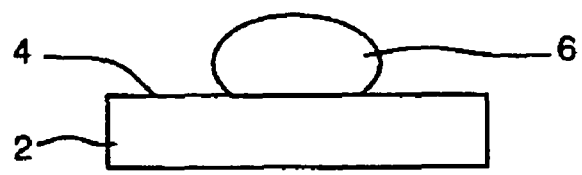
Figure 9:
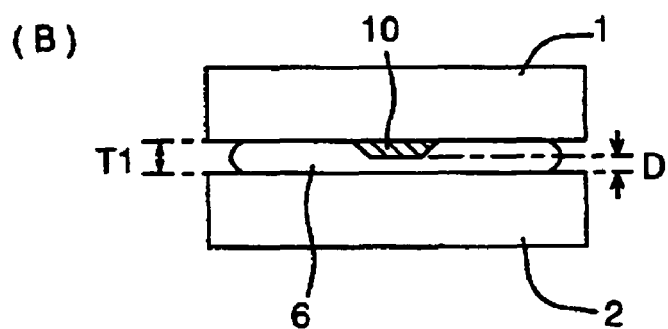
Figure 10:
FIGS. 10(A), 10(B) and 10(C), respectively, show examples of forms of the protruding portion.
Figure 10:
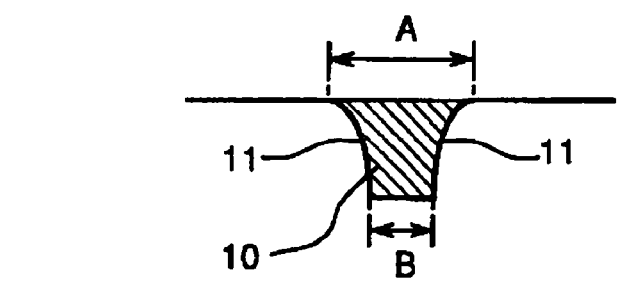
Figure 10:
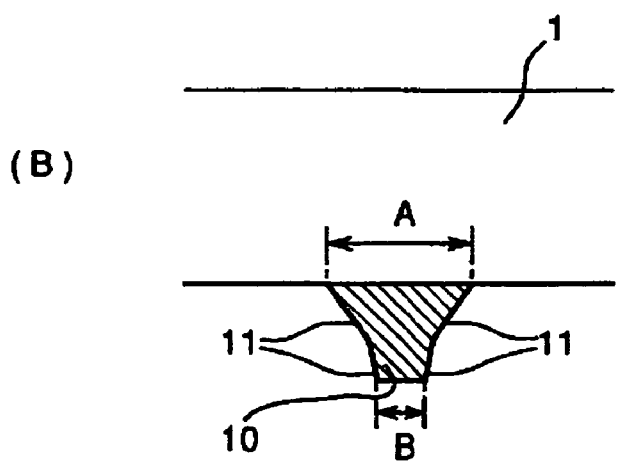
Figure 10:
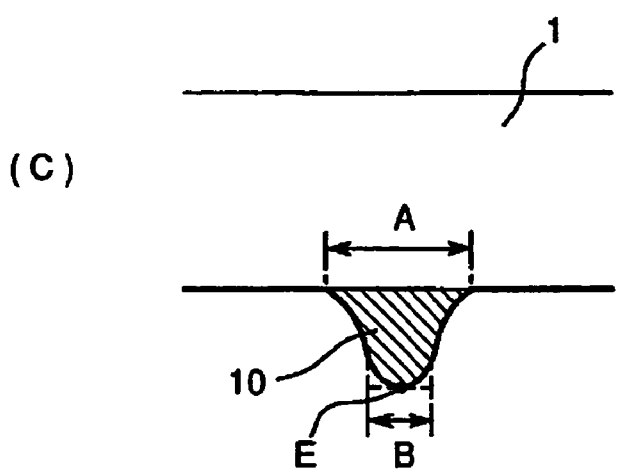

The term "form of a circular truncated cone" according to invention B is used to indicate the concept including not only the form of a single stage linear type circular truncated cone (FIG. 9) wherein the taper surface (side) 11 is prescribed with one line in the cross section that passes through the center axis of this form but, also, the form of a curved-type circular truncated cone (FIG. 10(A)) wherein the taper surface is prescribed with a curve, the form of a double stage linear type circular truncated cone (FIG. 10(B)) wherein the taper surface (side) 11 is prescribed with two lines, the form of a multiple stage linear type circular truncated cone (not shown) wherein the taper surface (side) 11 is prescribed with three lines, or more, and the like. FIGS. 10(A) and 10(B) show diameters A of the bottom surfaces and diameters B of the top surfaces.

In addition the edge of the outer periphery portion of the top surface may be rounded so that the top surface has a curved surface form. For example, FIG. 10(C) shows a form gained by rounding the edge of the outer periphery portion of the top surface in the form of the circular truncated cone shown in FIG. 10(A). B in such a form is B in the form before the edge is rounded. That is to say, B is the diameter of the top surface including vertex E in the form shown in FIG. 10(C).

Height H (see, for example, the enlarged diagram of FIG. 9(A)) of protruding portion 10 having the above described form is determined depending on distance T1 (see FIG. 9(B)) between the molding surface of the upper mold and the molding surface of the lower mold at the time of completion of the press molding process and is 0.5 T1 to 0.9 T1, preferably 0.7 T1 to 0.8 T1. T1 is a value determined by taking, into account, the desired thickness of the glass substrate of a hard disk to be gained as well as the amount of polishing and the amount of grinding in the below described lapping step and polishing step and is generally 0.7 mm to 2.5 mm, in particular 0.8 mm to 2.0 mm.

Though the material for forming protruding portion 10 is not specifically limited and the same material as the material that forms upper mold 1 and lower mold 2 can be utilized, a material having an excellent thermal conduction, in particular, a material having a thermal conductivity (preferably 25 kcal/mh °C. to 60 kcal/mh °C.) that is two times greater than that of the metal material of the plane portion, in particular, than the thermal conductivity of the upper mold material may be used from the point of view of an increase in the mold release. Cemented carbide alloy or cast iron can, for example, be cited as such materials. In the case that the mold release of the protruding portion increases, a recess can be easily created so that the thickness beneath the recess becomes comparatively thin in the glass substrate.

Though the configuration and the material of upper mold 1 and lower mold 2 are not specifically limited, it is preferable to use the configuration and the material that can keep the recess in the glass substrate at a comparatively high temperature at the time of press molding from the point of view of easily creating the recess in the glass substrate so that the portion below the recess becomes comparatively thin. The portion below the recess easily expands due to heat because the temperature in the recess is kept relatively high in the glass substrate. For example, the lower mold is formed so as to be divided into the center part and the outer periphery part so that the lower mold has a temperature distribution wherein the temperature of the center part is higher than that in the outer periphery part.

In the press molding step of invention B, as shown in FIG. 9(B), glass is compressed so that the thickness D of the glass compressed by protruding portion 10 becomes 0.1 T1 to 0.5 T1 (T1 is the same as the distance T1 between the molding surface of the upper mold and the molding surface of the lower mold at the time of completion of the above described press molding process), preferably 0.2 T1 to 0.3 T1 and, thereby, the form of protruding portion 10 and the molding surfaces 3 and 4 is effectively transferred to the glass so that a glass substrate having a recess corresponding to the protruding part is gained. In the case that D exceeds 0.5 T1, the amount of grinding for creating a hole in the below described first lapping step increases so that the load in this table increases and that manufacturing cost increases. In addition, the molding surface is not sufficiently transferred to the glass substrate and the surface precision of the gained glass substrate deteriorates. In the case that D is less than 0.1 T1, the glass substrate gained in this step cannot have the strength that allows the glass substrate to withstand the processes in the below described step. Therefore, in actuality, it becomes necessary to set T1 large enough so that the glass substrate can secure such strengths and, as a result, the manufacturing cost increases due to an increase in the amount of grinding.

The same conditions as the molding conditions in the press molding step according to invention A can be adopted for other molding conditions.

After carrying out the above described press molding process with recess creation, a crystallization process or an annealing process of the glass substrate is generally carried out in the same manner as in invention A and, as a result, the glass substrate is cooled (crystallization step or annealing step).

Next a first lapping process is carried out on the glass substrate that has been cooled down in the crystallization step or in the annealing step without carrying out a coring process (first lapping step). A hole is created by carrying out a grinding process, at least, on the surface, without the recess, of the glass substrate in the first lapping step and, furthermore, the surface having the recess is also polished, when desired, and, thereby, the parallelism and the thickness are pre-adjusted. Here pre-adjustment indicates an approximate adjustment to the degree that the dimensions can be adjusted to the prescribed dimensions in other later steps.

A method and a device of the first lapping process for either surface of the surface without the recess or of the surface having the recess are the same as the method and the device of the first lapping process according to invention A.

The above described first lapping process is carried out on, at least, the surface without the recess or on the two surfaces, when desired, and, thereby, at least a hole is created and preferably pre-adjustments concerning the parallelism, the flatness and the thickness as well as the surface coarseness and the maxim surface coarseness of the two surfaces of the glass substrate are preferably carried out in addition to the hole creation.

In the first lapping step, the amount of grinding not less than the thickness (equal to the above described D) of the portion below the recess can be achieved on the surface without the recess in the glass substrate. It is generally 0.1 mm to 0.9 mm.

In the case that a lapping process is carried out on the surface having a recess, the amount of grinding of this surface is generally 0.1 mm to 0.3 mm.

According to invention B, an outer diameter process, for example, an outer diameter scribing and splitting process or an outer diameter grinding process, may be carried out and, furthermore, a precision edge surface process may be carried out on the glass substrate on which the above described first lapping process has been carried out (first mode), or a precision edge surface process may directly be carried out on the glass substrate on which the above described first lapping process has been carried out (second mode).

Figure 11:
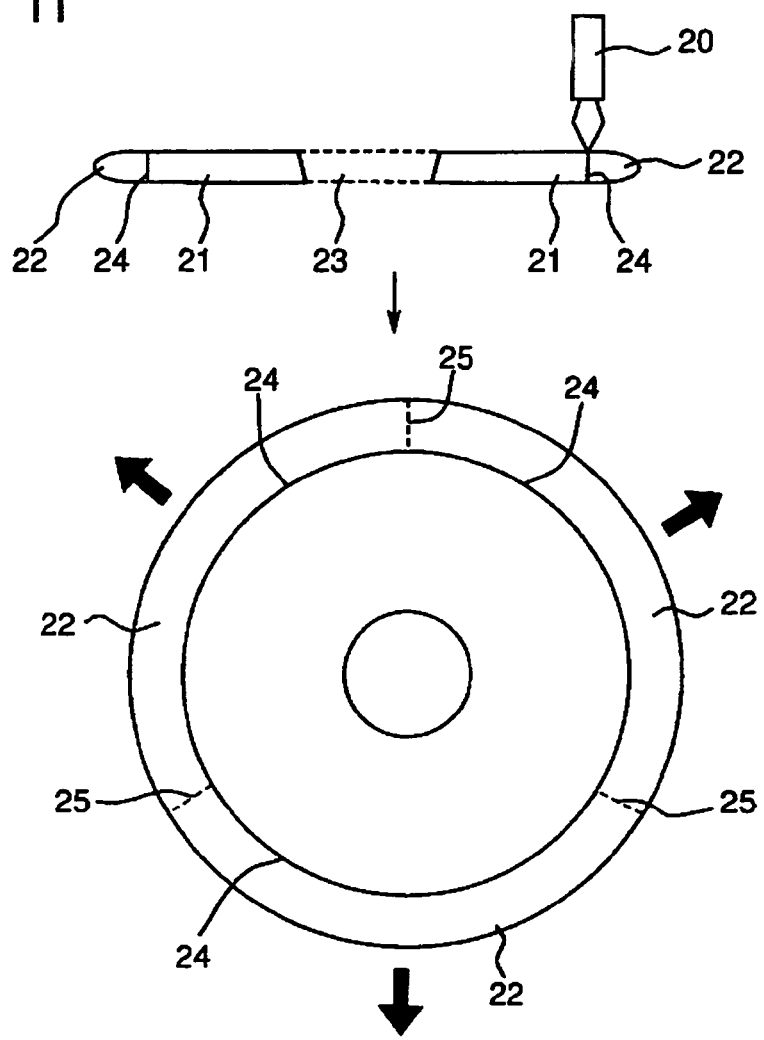
FIG. 11 represents a schematic cross sectional diagram and a schematic layout diagram for describing the outer diameter scribing and splitting step.
Figure 12:
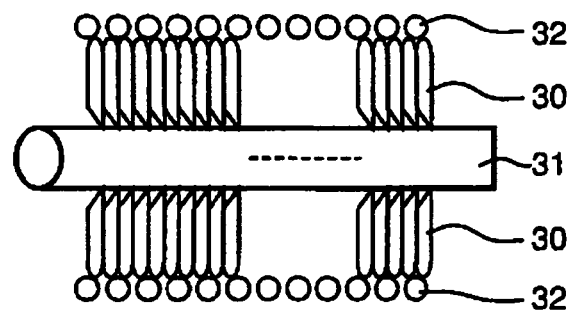
FIG. 12 is a schematic cross sectional diagram for describing the outer diameter grinding step.

According to the first mode, the outer diameter process is carried out using the hole as the reference. The same method as the method utilized in an outer diameter scribing and splitting process and utilized in an outer diameter grinding process in a well-known manufacturing method for a glass substrate of a hard disk can be adopted. In the outer diameter scribing and splitting process, for example, a scribing and splitting process is carried out on the outer periphery edge portion of a glass substrate using this hole as the reference. Described in detail, as shown in FIG. 11, a cutting line (scribing line) 24 is drawn in the form of a circle that is concentric with the hole 23 in outer periphery edge portion 22 of glass substrate 21 using a diamond cutter 20, or the like. Furthermore, a cutting line (scribing line) 25 is drawn in the diameter direction in a plurality of portions (three portions in FIG. 11) in outer periphery portion 22 using a diamond cutter, or the like, and the outer periphery portion is cracked and split from the glass substrate by pulling outer periphery portion 22 towards the outside in the diameter direction. In addition, in the outer diameter grinding process, for example, as shown in FIG. 12, a plurality of glass substrates 30 is overlapped by making an axel 31 pass through these holes and the grinding process is carried out on all of the outer periphery edge portions by means of a processing whetstone 32. In any of the above described processes the outer periphery edge surface and/or the inner periphery edge surface are further ground when desired so that the dimensions of the outer diameter and the circularity of the glass substrate as well as the concentricity of the glass substrate and the hole are pre-adjusted. When the outer diameter grinding process, shown in FIG. 12, is carried out, a plurality of glass substrates can be processed together and the manufacturing cost can easily be reduced.

Next, a precision edge surface process is carried out on a glass substrate on which an outer diameter scribing and splitting process or an outer diameter grinding process (hereinafter referred to simply as an outer diameter scribing and splitting process, or the like) has been carried out (first mode). According to invention B, a precision edge surface process may directly be carried out on the glass substrate on which the first lapping process has been carried out, without carrying out an outer diameter scribing and splitting process or an outer diameter grinding process (second mode). This is because the outer periphery edge portion of the glass does not make contact with any members in the above described press molding step so that the outer periphery edge surface of the glass substrate has an excellent free-form surface.

The same method as the method utilized in a precision edge surface process in a well-known manufacturing method for a glass substrate of a hard disk can be adopted. For example, as for the glass substrate on which the outer diameter scribing and splitting process, or the like, has been carried out according to first mode, the outer periphery edge surface and the inner periphery edge surface of the hole in the glass are ground or rounded so that the dimensions of the outer diameter and the circularity of the glass substrate, the dimensions of the inner diameter of the hole as well as the concentricity of the glass substrate and the hole are microscopically adjusted to the prescribed degree and dimensions. In addition, as for the glass substrate on which the first lapping process has been carried out according to the second mode, the inner periphery edge surface in the glass substrate is ground or is rounded so that the dimensions of the inner diameter of the hole and the circularity of the glass substrate are microscopically adjusted to the prescribed dimensions and degree. As for the grinding material, a diamond whetstone can be utilized in addition to the grinding material utilized in the precision inner periphery edge surface process of invention A.

Next, an edge surface polishing process is carried out on the glass substrate of which the dimensions of the inner diameter, or the like, have been microscopically adjusted in the precision edge surface process (edge surface polishing process). The same method as the method of the edge surface polishing process in a well-known manufacturing method for a glass substrate of a hard disk can be adopted. For example, as for the glass substrate on which the outer diameter scribing and splitting process, or the like, has been carried out in the first mode, the outer periphery edge surface of the glass substrate and the inner periphery edge surface of the hole are polished so that microscopic scratches, or the like, are removed. In addition, as for the glass substrate on which the first lapping process has been carried out in the second mode, the inner periphery edge surface of the hole in the glass substrate is polished so that microscopic scratches, or the like, are removed. In the case that the edge surfaces have scratches, the glass substrate easily breaks in response to impact. As for the polishing material utilized in this step, cerium oxide, for example, is cited.

Next, the formation precision of the surfaces of the glass substrate of which the edge surfaces have been polished in the edge surface polishing step is attained (modified) by polishing the two surfaces of the glass substrate (second lapping step). That is to say, the form quality (parallelism, flatness and thickness) of the final disk is achieved and, at the same time, the surface coarseness and the maximum surface coarseness, which can be adjusted in the below described polishing step, are attained.

The method and the device utilized in the second lapping process are the same method and device utilized in the second lapping process according to invention A.

Next, the smoothness of the surfaces of the glass substrate on which the lapping process has been carried out is attained (adjusted) by polishing the glass substrate (polishing step).

The method and the device utilized in the polishing process are the same method and device utilized in the polishing process according to invention A.

Finally, the glass substrate on which the polishing process has been carried out is washed and inspected (washing step and inspection step). The descriptions of the washing step and inspection step are the same as in invention A.

In the manufacturing method for a glass substrate of a hard disk according to another mode of invention B, it is preferable for the above described press molding process with recess creation to be carried out so that glass is compressed between the upper mold and the lower mold while parallel spacers are intervened between the upper mold and the lower mold and while the outer periphery portion of the glass and the parallel spacers maintain a non-contact condition. The parallel spacers have the function of holding the molding surface of the upper mold and the molding surface of the lower mold parallel to each other immediately before the completion of press molding. The precision of the parallelism, the flatness and the thickness dispersion of the glass substrate to be gained increases when the press molding process is carried out as described above. Therefore, the first lapping process of the surface having a recess that is primarily carried out for the purpose of pre-adjustment of the parallelism, the flatness and the thickness in the first lapping step can be omitted. In addition, the period of time of this process can be shortened even in the case that the first lapping process is carried out on the surface having a recess so that manufacturing costs can be reduced.

Figure 13:
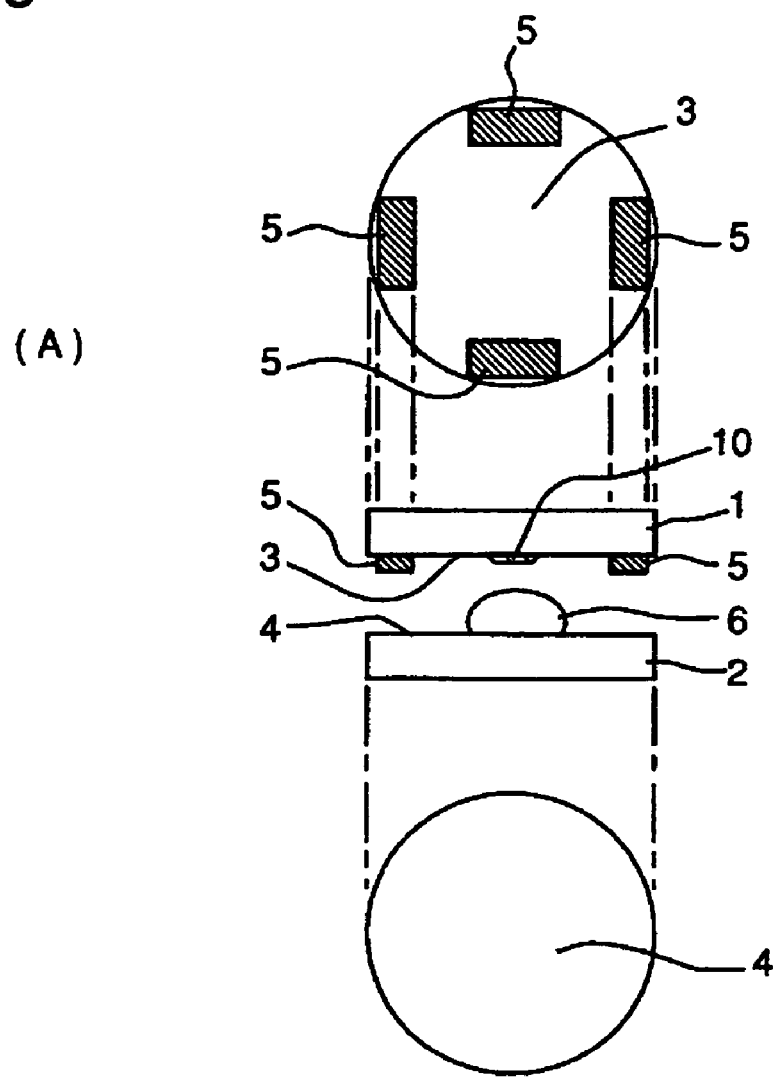
FIG. 13(A) is a schematic configuration diagram, showing upper and lower molds, for describing one example of a manufacturing method for a glass substrate of a hard disk according to invention B
FIG. 13(B) is a schematic state diagram of the upper mold and the lower mold after press molding has been carried out using the upper and lower molds of FIG. 13(A)
Figure 13:
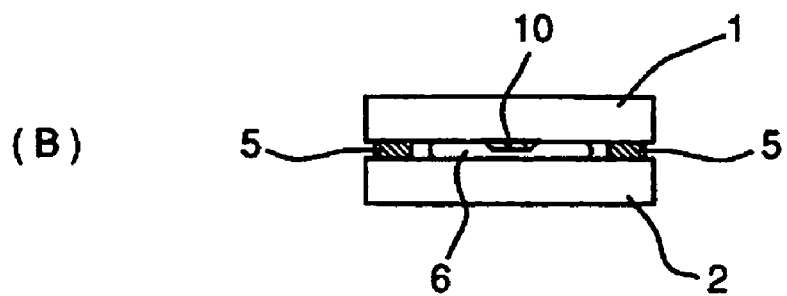

Described in detail, as shown in, for example, FIGS. 13(A) and 13(B), when glass is compressed by moving upper mold 1 and lower mold 2 so as to be close to each other, this movement toward each other is limited by parallel space 5 so as to regulate the thickness of the melted glass 6 (see FIG. 13(B)). At this time, parallel spacer 5 is installed at the outer periphery portion on the molding surface so that the outer periphery portion of the glass and the parallel spacer can maintain the non-contact condition at the time of the press molding (see FIG. 13(B)) and, therefore, the outer periphery portion of the glass does not make contact with parallel spacer 5 so that a high precision with respect to the parallelism, the flatness and the thickness dispersion can be achieved. In addition, the molding surfaces of the metal molds can be effectively transferred to the surfaces of the glass substrate. When the glass makes contact with a parallel spacer at the time of press molding, melted glass invades between the parallel spacer and the molded surface so that the parallelism and the flatness of the glass to be gained deteriorate. Furthermore, when molding is repeated, the deterioration of the parallelism and of the flatness becomes significant and the thickness dispersion also becomes significant. In addition, the molded surface cannot effectively be transferred. FIG. 13(A) represents a schematic cross sectional diagram of the upper mold and the lower mold provided with parallel spacers and a protruding portion, a schematic layout diagram of the upper mold as seen from below and a schematic layout diagram of the lower mold as seen from above. FIG. 13(B) represents a schematic state diagram of the upper mold and the lower mold when press molding is carried out using the upper mold and the lower mold of FIG. 13(A).

Members in FIGS. 13(A) and 13(B), to which the same numbers are attached as in FIGS. 9(A) and 9(B) are the same members having the same numbers as in FIGS. 9(A) and 9(B), of which the descriptions are omitted.

The descriptions of the precisions of the parallelism, the flatness, the thickness dispersion, the surface coarseness, and maximum surface coarseness in the contact surfaces and the molded surfaces of the parallel spacers, the upper mold and the lower mold as well as the precision of the glass substrate gained through crystallization or through the annealing process after the press molding process according to this mode of invention B are the same as in the mode according to invention A wherein parallel spacers are used and, therefore, descriptions thereof are omitted.

As described above, according to the method of invention B, a glass substrate of a hard disk provided with a center hole can be manufactured simply and at a low cost.

Invention C

The above described press molding devices of FIGS. 3, 6 and 7 are suitable for utilizing the press molding method of invention C.

The press molding method of invention C that is used by the above described device attains molded articles having a significantly high precision of parallelism, flatness and thickness dispersion and, therefore, this can be effectively adopted in the press molding step in a manufacturing method for a molded article (for example, a glass substrate of a hard disk) wherein a high precision is required. In particular, when the press molding method of invention C is utilized in a manufacturing method for a glass substrate of a hard disk, the first lapping step that has been conventionally required can be omitted and, preferably, the first lapping step and the second lapping step are omitted and, as a result, the manufacturing cost of a glass substrate of a hard disk can easily be reduced. In the following, the press molding method of invention C is described in detail using the description of the manufacturing method for a glass substrate of a hard disk wherein this method is utilized.

(First Mode)

Figure 14:
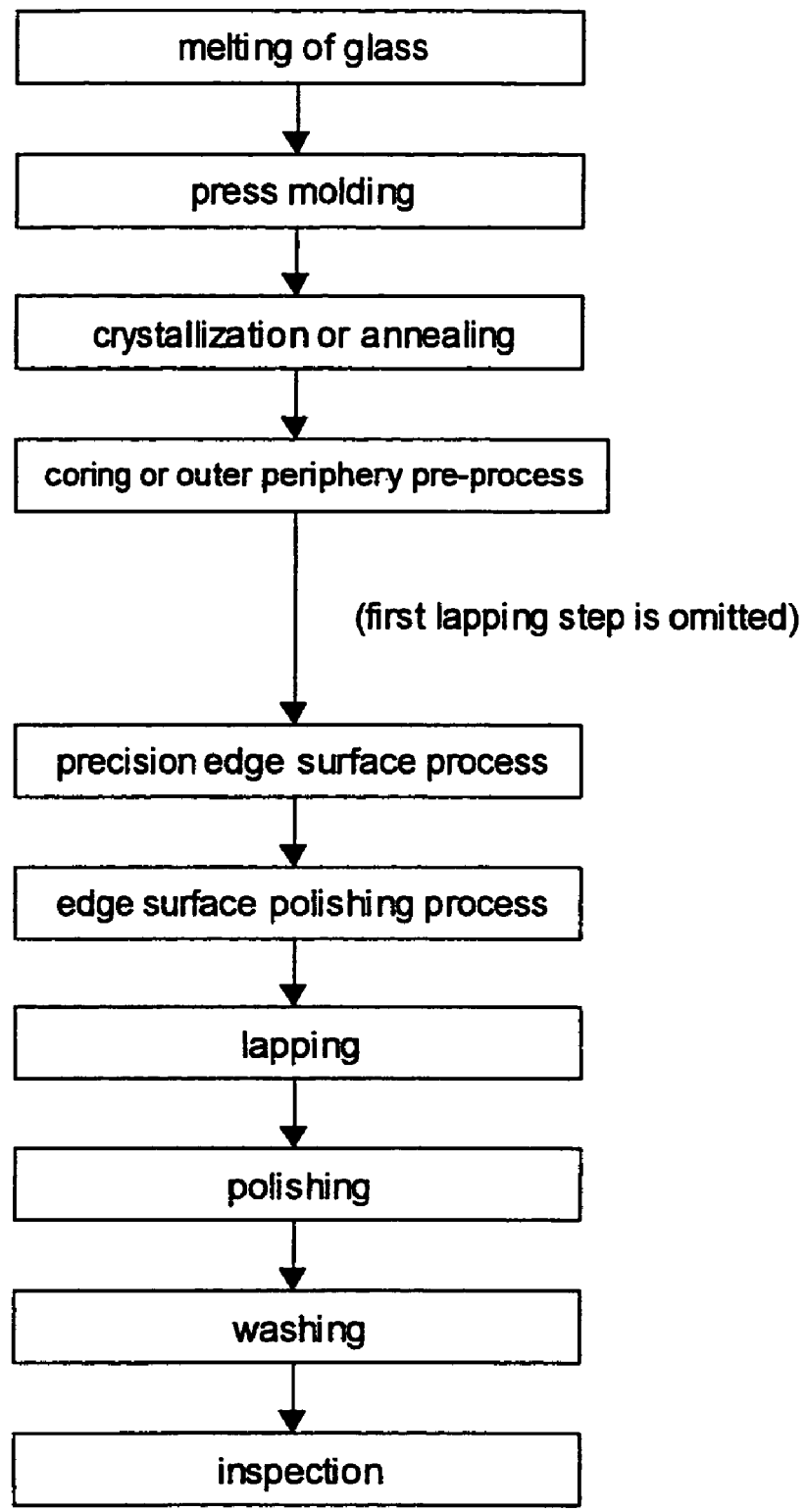
FIG. 14 is a flow chart of an example of a manufacturing method for a glass substrate of a hard disk according to invention C.

The manufacturing method for a glass substrate of a hard disk according to the first mode is shown in the flow chart of FIG. 14.

When a glass substrate of a hard disk is manufactured, first, glass material is melted (glass melting step). The utilized glass material is not specifically limited and a glass material such as lithium aluminosilicate glass or aluminosilicate glass may be appropriately selected for use according to the desired mode (crystallized glass or amorphous glass) of the glass substrate to be gained.

Next, the melted glass is made to flow into the lower mold and, after that, the glass is compressed between the upper mold and the lower mold (press molding step) while parallel spacers are intervened between the upper mold and the lower mold and while the outer periphery portion of the glass and the parallel spacers maintain the non-contact condition. The same conditions as the molding conditions in a well-known manufacturing method for a glass substrate of a hard disk can be adopted. For example, the pressure for the press molding and the period of time of pressing are appropriately set within the same range as in invention A.

Described in detail, in the case that a device as shown in FIG. 3 is used when, for example, upper mold 1 and lower mold 2 are moved toward each other so as to compress the glass in the press molding step, this movement toward each other is restricted by parallel spacers 5 and only the thickness of melted glass 6 is prescribed (see FIG. 3(B)). At this time, the outer periphery portion of the glass does not make contact with a parallel spacer 5 and, therefore, a high precision in reference to the parallelism, the flatness and the thickness dispersion can be achieved the molding surfaces of the metal molds can be effectively transferred to the surfaces of the glass substrate. In the case that the glass makes contact with a parallel spacer at the time of press molding, the melted glass invades between the parallel spacer and the molding surface so that the parallelism and the flatness of the glass substrate to be gained deteriorate. Furthermore, when molding is repeated, the deterioration of parallelism and flatness becomes remarkable and the thickness dispersion also becomes remarkable.

According to invention C, it is preferable for the surfaces of the parallel spacers that make contact with the upper mold and the lower mold, the surfaces of the upper mold and the lower mold that make contact with the parallel spacers as well as the molding surfaces of the upper mold and the lower mold to have a parallelism of 10 μm, or less, preferably 5 μm, or less, and a flatness of 10 μm, or less, preferably 5 μm, or less, in order to achieve an increase in the precision concerning the parallelism, the flatness and the thickness dispersion. In addition, it is preferable for each of the above described surfaces to have a surface coarseness (Ra) of 3 μm, or less, preferably 1.5 μm, or less, and to have a maximum surface coarseness (Rmax) of 20 μm, or less, preferably 8 μm, or less, from the point of view of gaining the above described glass substrate of a high precision for a long period of time. The thickness (height) of parallel spacers 5 is not specifically limited and it may, for example, be 0.8 mm to 2.0 mm.

The amount of melted glass that is made to flow in the lower mold is not specifically limited and may be an amount that prevents the outer periphery portion of the glass from making contact with a parallel spacer in the press molding step. This is generally set by appropriately taking into account the desired size of the molded article and the size that can be molded between the upper mold and the lower mold without contact being made with a parallel spacer. According to the method of invention C, a glass substrate having a high of parallelism of and thickness dispersion can be gained as long as the outer periphery portion of the glass does not make contact a parallel spacer in the press molding step, even in the case that an slightly excessive amount, relative to a predetermined amount, of melted glass is supplied.

Next, a crystallization process or an annealing process of the glass substrate is generally carried out in the same manner as in invention A after press molding has been carried out and, as a result, the glass substrate is cooled (crystallization step or annealing step).

According to invention C, when such a crystallization or annealing process is carried out, a glass substrate having a precision equal to, or greater than, the precision achieved, for the first time, after the first lapping process according to a conventional method, that is to say, a parallelism of 20 μm, or less, preferably, 10 μm, or less, a flatness of 20 μm, or less, preferably, 10 μm, or less, and a thickness dispersion of ±10 μm, preferably ±5 μm, is gained. Furthermore, the molding surfaces of the upper mold and the lower mold are effectively transferred to this glass substrate so that the glass substrate has a surface coarseness of 3 μm, or less, preferably 1.5 μm, or less, and a maximum surface coarseness of 20 μm, or less, preferably 8 μm, or less.

Next, a coring process or an outer periphery pre-process is carried out on the glass substrate that has been cooled in the crystallization step or in the annealing step (coring step or outer periphery pre-processing step. Whether a coring process or an outer periphery pre-process is carried out depends on whether or not it is necessary to create a hole at the center portion of a glass substrate to be gained.

The same method as the method of a coring process and an outer periphery pre-process in a well-known manufacturing method for a glass substrate of a hard disk can be adopted. For example, in the coring process the outer periphery edge portion of the substrate is cut off and the center portion is cut out (hole is opened) by means of a diamond cutter, or the like, and, furthermore, a grinding process is carried out on the outer periphery edge surface and on the inner periphery edge surface of the hole, when desired, and, thereby, the dimensions of the outer diameter and the circularity of the glass substrate, the dimensions of the inner diameter of the hole and the concentricity of the glass substrate and the hole are pre-adjusted. In the outer periphery pre-process the outer periphery edge portion of the substrate is cut off by means of a diamond cutter, or the like, and, furthermore, a grinding process is carried out on the outer periphery edge surface when desired and, thereby, the dimensions of the outer diameter and the circularity of the glass substrate are pre-adjusted. Here, pre-adjustment indicates an appropriately adjustment to the degree that the dimensions can be adjusted to the prescribed dimensions in the following steps.

It is not necessary for the glass substrate of which the dimensions of the outer diameter, and the like, have been pre-adjusted in the coring step or in the outer periphery pre-processing step to be subjected to the first lapping step as in the prior art but, rather, it is submitted to the precision edge surface processing step (precision edge surface processing step). Since a glass substrate having a high precision of parallelism, flatness and thickness dispersion, and the like, has been gained in the above described press molding process, it is not necessary to pre-adjust the parallelism, the flatness and the thickness of the glass substrate through a grinding process, so that the first lapping process can be omitted.

The same method as the method of a precision edge surface process in a well-known manufacturing method for a glass substrate of a hard disk can be adopted. For example, as for a glass substrate that has undergone the coring step, the outer periphery edge surface and the inner periphery edge surface of the hole of the glass substrate are ground or rounded so that the dimensions of the outer diameter and the circularity of the glass substrate, the dimensions of the inner diameter of the hole and the concentricity of the glass substrate and the hole are microscopically adjusted to the prescribed dimensions and degree. In addition, as for a glass substrate that has undergone the outer periphery pre-processing step, the outer periphery edge surface of the glass substrate is ground or is rounded so that the dimensions of the outer diameter and the circularity of the glass substrate are microscopically adjusted to the prescribed dimensions and degree. Fixed abrasive grains (diamond pellets), free abrasive grains (slurry such as of alumina or SiC), and the like, can be utilized as grinding material.

Next, an edge surface polishing process is carried out on a glass substrate of which the dimensions of the outer diameter, and the like, have been microscopically adjusted in the precision edge surface processing step (edge surface polishing step). The same method as the method of an edge surface polishing process in a well-known manufacturing method for a glass substrate of a hard disk can be adopted. For example, as for a glass substrate that has undergone the coring step, the outer periphery edge surface and the inner periphery edge surface of the hole of the glass substrate are polished so that microscopic scratches are removed. In addition, as for a glass substrate that has undergone the outer periphery pre-processing step, the outer periphery edge surface of the glass substrate is polished so that microscopic scratches are removed. This is because a glass substrate can easily break in response to impact in the case that the edge surface has scratches. For example, cerium oxide can be cited as polishing material to be utilized in this step.

Next, a grinding process is carried out on the two surfaces of a glass substrate of which the edge surface has been polished in the edge surface polishing step so as to attain (modify) the form precision of the surfaces (lapping step corresponding to the conventional second lapping step). That is to say, the form quality (parallelism, flatness and thickness) of the final disk is attained and, at the same time, the surface coarseness and the maximum surface coarseness, which can be adjusted in the below described polishing step, are attained.

The same method as the method of the second lapping process in a well-known manufacturing method for a glass substrate of a hard disk can be adopted as the method of the lapping process. Described in detail, the same method and device as in the second lapping process of invention A are used.

Next, smoothness of the surface is attained by polishing the glass substrate on which the lapping process has been carried out (polishing step). That is to say, the unevenness of the surface is eliminated so as to attain the smoothness (surface coarseness, maximum surface coarseness) of the final disk.

The same method as the method of a polishing process in a well-known manufacturing method for a glass substrate of a hard disk can be adopted. Described in detail, the same method and device as in the polishing process of invention A are used.

Finally, the glass substrate on which the polishing process has been carried out is washed and inspected (washing step and inspection step). The descriptions of the washing step and inspection step are the same as in invention A.

In the above described manufacturing method for a glass substrate of a hard disk according to the first mode of invention C, a specific press molding process is carried out using the above described parallel spacers and, therefore, a glass substrate of a hard disk having a high precision of parallelism, flatness and thickness dispersion and having excellent surface coarseness and maximum surface coarseness can easily and repeatedly be gained.

(Second Mode)

In a manufacturing method for a glass substrate of a hard disk according to the second mode, not only the conventional first lapping step but, also, the second lapping step (referred to as "lapping step," only, in the above described first mode) can be omitted by selecting the upper mold and the lower mold as well as parallel spacers. That is to say, a material having a high rigidity is utilized as the material of the upper mold and the lower mold as well as of the parallel spacers and the precision of these is enhanced and, thereby, a glass substrate on which the edge surface polishing process has been carried out can be directly be submitted to the polishing step.

Figure 15:
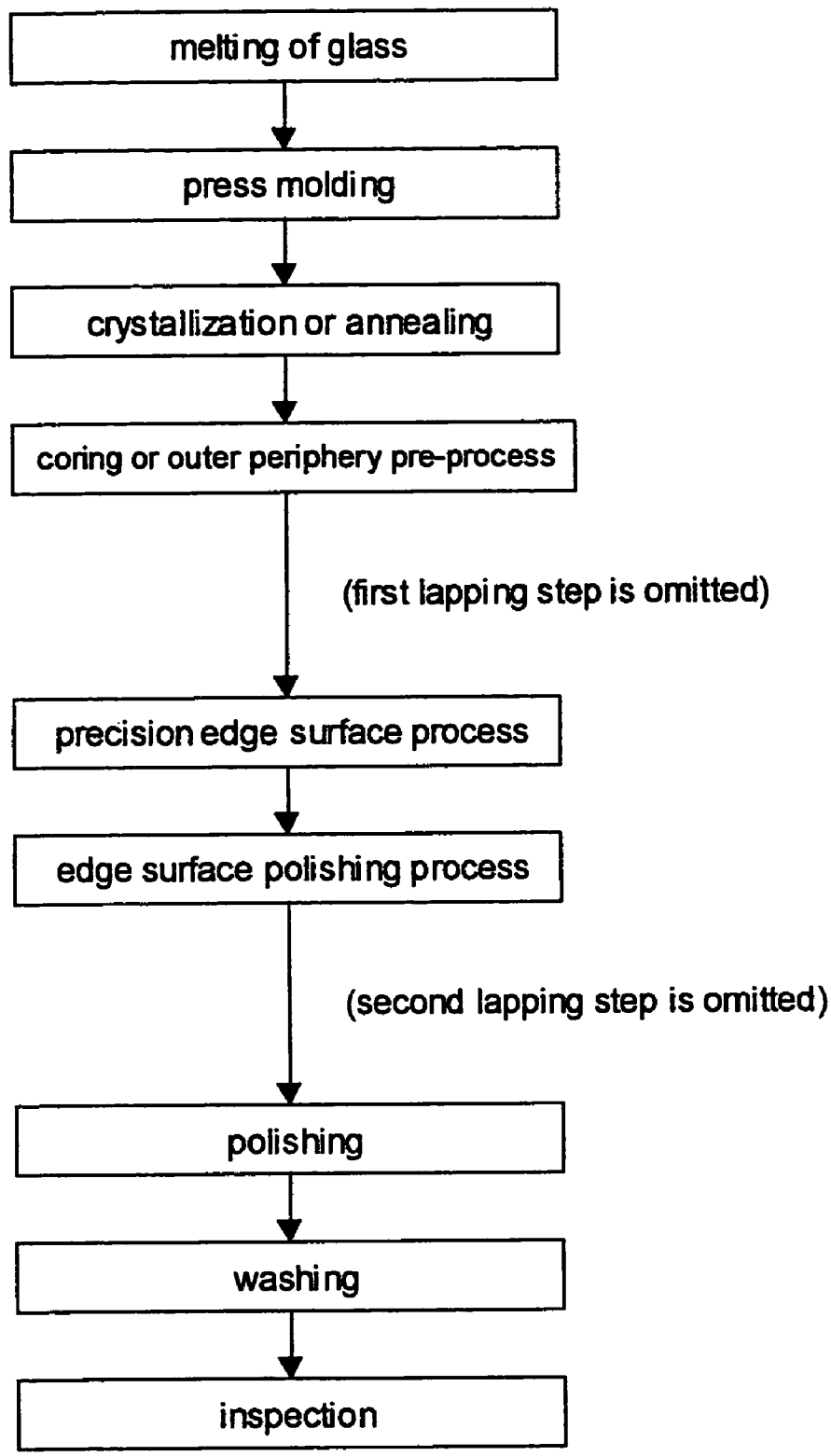
FIG. 15 is a flow chart of an example of a manufacturing method for a glass substrate of a hard disk according to invention C.
Figure 16:
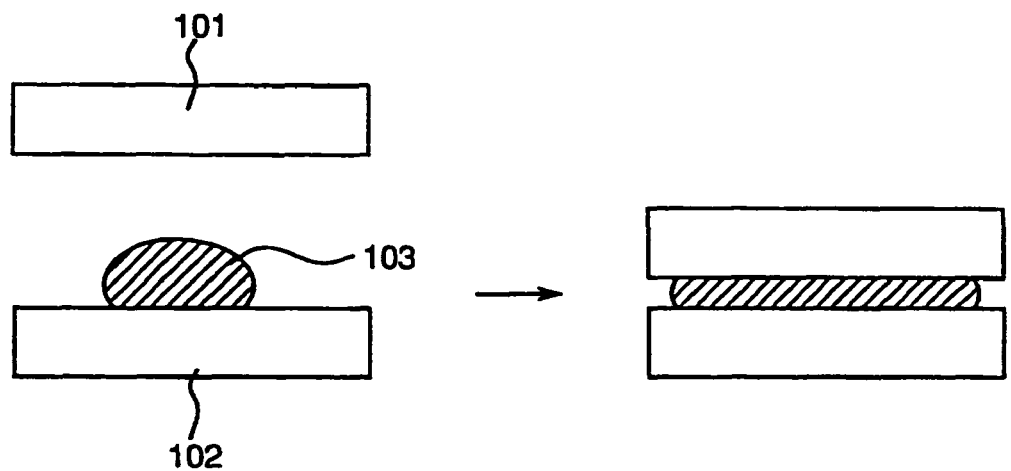
FIG. 16 is a schematic configuration diagram of metal molds for describing a press molding method according to a prior art.
Figure 17:
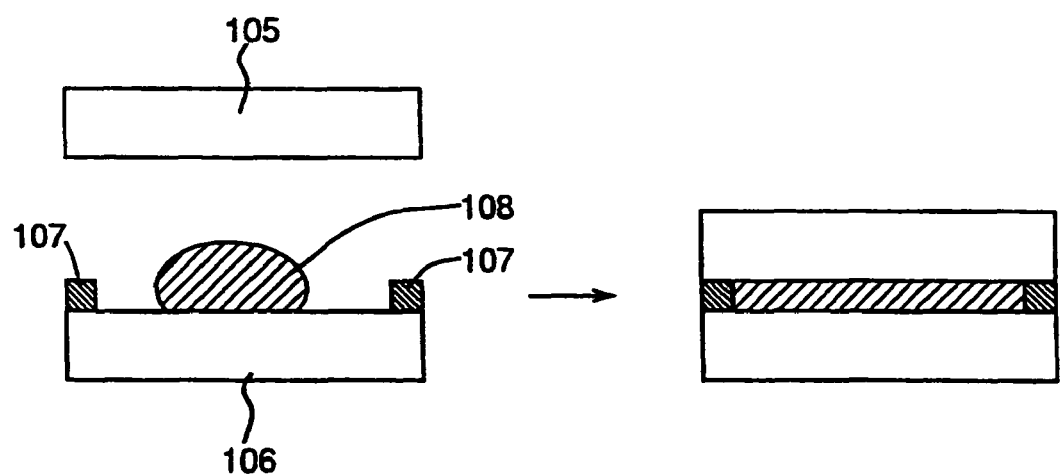
FIG. 17 is a schematic configuration diagram of metal molds for describing a press molding method according to a prior art.

The second mode of invention C is shown in the flow chart of FIG. 15. In the manufacturing method for a glass substrate of a hard disk according to the second mode, the same method as the method in the first mode of invention C is used except for the utilization of a material having a high rigidity as the material of the upper mold and the lower mold as well as of the parallel spacers and except for the enhancement of the precision of these as well as except for the direct submission of a glass substrate that has undergone the edge surface polishing process to the polishing step and, therefore, the descriptions of the parts in common are omitted.

In the second mode, stainless steel, cemented carbide alloy, cast iron, ceramic, and the like, are utilized as the material of the upper mold and the lower mold as well as of the parallel spacer.

In addition, the surfaces of the parallel spacers that make contact with the upper mold and the lower mold, the surfaces of the upper mold and the lower mold that make contact with the parallel spacers and the molding surfaces of the upper mold and the lower mold has a parallelism of 10 μm, or less, preferably 5 μm, or less, a flatness of 10 μm, or less, preferably 5 μm, or less, a surface coarseness of 1 μm, or less, preferably 0.8 μm, or less and a maximum surface coarseness of 5 μm, or less, preferably 3 μm, or less.

When the above described press molding process and annealing process or crystallization process are carried out using the above described upper mold and lower mold as well as parallel spacers, a glass substrate having the parallelism, the flatness, the surface coarseness and the maximum surface coarseness that could be achieved for the first time after the completion of the lapping step in the first mode can be gained. Therefore, a glass substrate that has undergone the edge surface polishing process can be directly submitted to the polishing step without being submitted to the lapping step.

In the case that the conventional first and second lapping steps are omitted as described above, the precision, in particular, of the molding surfaces of the upper mold and the lower mold is further enhanced and, thereby, the polishing process becomes easy. That is to say, when the molding surfaces of the upper mold and the lower mold has a surface coarseness of 0.8 μm, or less, and has a maximum surface coarseness of 3 μm, or less, a glass substrate having a surface coarseness of 0.8 μm, or less, and a maximum surface coarseness of 3 μm, or less, is gained through the press molding process so that the period of time of processing in the polishing step is shortened.

As described above, according to the press molding method of invention C, a molded article with a high precision concerning the parallelism, the flatness, and the thickness dispersion can be easily gained. The press molding method of invention C can be adopted in the press molding step in a manufacturing method for a glass substrate of a hard disk and, thereby, the number of steps in the manufacturing method can be reduced and, as a result, the manufacturing cost of a glass substrate can be reduced.

In the descriptions of the inventions A to C mentioned above, a substrate of a hard disk was explained as an example. But the inventions A to C are not restricted to a substrate of a hard disk and can be applied to the other use, such as substrates of an optical disk and a magnetic optical disk and the like.

EXAMPLES

Experimental Example A

A glass substrate was manufactured under the conditions shown in the following table according to the flow chart shown in FIG. 1.

Example A1

A glass substrate of a hard disk of which the outer periphery portion is unprocessed provided with a center hole was manufactured according to the flow chart of FIG. 1. The lithium aluminosilicate-based glass had the following composition of: 69.0 wt. % of $SiO_2$, 8.5 wt. % of $Al_2O_3$, 2.0 wt. % of MgO, 0.5 wt. % of $TiO_2$, 7.0 wt. % of $Li_2O$, 7.0 wt. % of ZnO, 2.5 wt. % of $P_2O_5$ and 3.5 wt. % of $ZrO_2$.

Comparison Example A1

A glass substrate of a hard disk provided with a center hole is manufactured following the same method as in Example A1 except for the carrying out of a conventional coring process in place of the center of gravity coring process, except for the carrying out of a conventional precision edge surface process (inner and outer) in place of the precision inner periphery edge surface process and except for the carrying out of a conventional edge surface polishing process (inner and outer).

In the conventional coring process the outer periphery edge portion of a glass substrate is cut off so that the dimensions of the outer diameter and the circularity of the glass substrate are pre-adjusted and, after that, the center hole is created by setting the center of this glass substrate as the center of the hole.

In the conventional precision edge surface process (inner and outer), the outer periphery edge surface is ground and is rounded together with the inner periphery edge surface of the center hole.

In the conventional edge surface polishing process (inner and outer), the outer periphery edge surface is polished together with the inner periphery edge surface of the center hole.

Example A2

A glass substrate of a hard disk of which the outer periphery portion is unprocessed and not having a center hole was manufactured according to the flow chart of FIG. 1. The borosilicate-based glass has the following composition of: 64.0 wt. % of $SiO_2$, 5.5 wt. % of $B_2O_3$, 11.5 wt. % of $Al_2O_3$, 5.4 wt. % of $Li_2O$, 4.0 wt. % of $Na_2O$, 9.0 wt. % of $K_2O$, 0.5 wt. % of CaO, 0.1 wt. % of $Ta_2O_5$.

TABLE 1

Flow Chart of FIG. 1

| Step | Conditions |
| --- | --- |
| melting of glass | glass type: lithium aluminosilicate-based glass (Tg: 500° C.) |
| Press molding | The edge surface of the outer periphery portion of the glass was not regulated. Pressure for press molding: 50 kg/cm², period of time of pressing; 1.5 seconds |
| crystallization | maximum heating temperature; 700° C. |
| center of gravity coring | The center hole was created setting the center of gravity of the glass substrate as the center.<br>device; coring device manufactured by Nakamura-Tome Precision Industry Co., Ltd. |
| First lapping | device: double-surface lapping board manufactured by Hamai Company Limited<br>grinding material: diamond pellets |
| precision inner periphery edge surface process | grinding material diamond whetstone |
| inner periphery edge surface polishing | polishing material: cerium oxide |
| second lapping | device: double-surface lapping board manufactured by Hamai Company Limited<br>grinding material: diamond pellets |
| polishing | device: double-surface polishing board manufactured by Hamai Company Limited<br>polishing material: cerium oxide |
| washing | pure water ultrasonic washing, device: Sonic Fellow Co., Ltd. |

TABLE 2

Flow Chart of FIG. 1

| Step | Conditions |
| --- | --- |
| melting of glass | glass type: borosilicate-based glass (Tg: 500° C.) |
| press molding | The edge surface of the outer periphery portion of the glass was not regulated. Pressure for press molding: 50 kg/cm², period of time of pressing; 1.5 seconds |
| annealing | maintained temperature (Tg + 20)° C., maintenance for five hours, cooling: gradual cooling at 10° C./h to (Tg − 150)° C., subsequently left to cool |
| first lapping | device: double-surface lapping board manufactured by Hamai Company Limited grinding material: diamond pellets |
| second lapping | device: double-surface lapping board manufactured by Hamai Company Limited grinding material: diamond pellets |
| polishing | device: double-surface polishing board manufactured by Hamai Company Limited polishing material: cerium oxide |
| washing | pure water ultrasonic washing, device: Sonic Fellow Co., Ltd. |

Comparison Example A2

A glass substrate of a hard disk not having a center hole was manufactured following the same method as in Example A2 except for the carrying out of a conventional outer periphery pre-process after the annealing process and before the first lapping process, and except for the carrying out of a conventional precision edge surface process and a conventional edge surface polishing process after the first lapping process and before the second lapping process.

In the conventional outer periphery pre-process, the outer periphery edge portion of a glass substrate was cut off so that the dimensions of the outer diameter and the circularity of the glass substrate are pre-adjusted.

In the conventional precision edge surface process, the outer periphery edge surface was ground and was rounded.

In the conventional edge surface polishing process, the outer periphery edge surface was polished.

Example A3

A glass substrate of a hard disk of which the outer periphery portion is unprocessed provided with a center hole was manufactured following the same method as in Example A1 except for the usage of magnesium aluminosilicate-based glass having the below described composition of: 45.0 wt. % of $SiO_2$, 18.0 wt. % of $Al_2O_3$, 19.0 wt. % of MgO, 10.0 wt. % of $TiO_2$, 1.5 wt. % of ZnO, 1.5 wt. % of $P_2O_5$, 3.0 wt. % of $ZrO_2$, 2.0 wt. % of $Nb_2O_5$.

The gained glass substrate was evaluated and the result thereof is shown in the following.

<measurement of Ra (rim) and Rmax (nm)> measurement device: AFM (Atomic Force Microscope DI3000; manufactured by Digital Instruments Company)

measurement range: 20 μm×20 μm

Surface vibration did not occur in glass substrates gained as in Examples A1 and A3 when they were rotated using the center hole as the center of rotation.

Surface vibration did not occur in a glass substrate gained as in Example A2 when it was rotated with a rotational axel linked to center of gravity thereof.

A base layer (film thickness of 100 nm) made of Ni—Al, a recording layer (film thickness of 20 nm) made of Co—Cr—Pt and a protective layer (film thickness of 5 nm) made of DLC: diamond-like carbon were sequentially layered on top of glass substrates gained as in the examples and the comparison examples (100 for each).

The outer periphery edge surfaces of all of the glass substrates with layers were observed by means of a differential interference microscope with a magnification of fifty times.

Layers of a good condition were formed on all of the glass substrates of Examples A1 to A3.

Defective film formation due to microscopic scratches occurred in twenty glass substrates of Comparison Example A1.

Defective film formation due to microscopic scratches occurred in thirty-five glass substrates of Comparison Example A2.

TABLE 3

| | outer diameter (mm) | thickness (mm) | top surface and bottom surface | | center hole inner diameter (mm) | outer periphery edge surface | | | E/ρ (GPa·cm²) | as (×10⁻⁷/° C.) |
| --- | --- | --- | --- | --- | --- | --- | --- | --- | --- | --- |
| | | | Ra (nm) | Rmax (nm) | | Ra (nm) | Rmax (nm) | amount of exuded alkaline components (μg/cm²) | | |
| Example A1 | 65 | 0.635 | 0.5 | 5.0 | 20 | 0.8 | 90 | 0.20 | 38 | 120 |
| Comparison Example A1 | 65 | 0.635 | 0.5 | 5.0 | 20 | 3.0 | 23 | 0.22 | 38 | 120 |
| Example A2 | 48 | 0.381 | 0.5 | 5.0 | — | 0.6 | 80 | 0.31 | 32 | 83 |
| Comparison Example A2 | 48 | 0.381 | 0.5 | 5.0 | — | 2.8 | 180 | 0.33 | 32 | 83 |
| Example A3 | 95 | 1.270 | 0.5 | 5.0 | 25 | 0.8 | 85 | 0.00 | 48 | 63 |

Experimental Example B

Example B1

A glass substrate of a hard disk provided with a center hole was manufactured according to the flow chart of FIG. 8. Detailed conditions are shown in Tables 4 and 5.

TABLE 4

Flow Chart of FIG. 8

| Step | Conditions |
|---|---|
| melting of glass | glass type: lithium aluminosilicate-based glass (Tg: 500° C.) |
| press molding with recess creation | [device conditions] device of FIG. 9 (protruding portion) in the form of a one stage linear-type circular truncated cone, wherein B/A = 0.9, A = 19 mm, H = 1.3 mm and the material is cemented carbide alloy [molding conditions] center portion of lower mold; 500° C., outer periphery portion of lower mold; 450° C., upper mold; 400° C., protruding portion; 450° C., pressure for press molding; 50 kg/cm², period of time of pressing; 1.5 seconds |
| crystallization | maximum heating temperature; 700° C. [glass substrate after cooling] diameter of width in the recess: 19 mm |
| first lapping | device: double-surface lapping board manufactured by Hamai Company Limited grinding material: diamond pellets amount of grinding (thickness direction): surface having recess: 450 μm, surface not having recess: 550 μm |

TABLE 5

| | |
|---|---|
| outer diameter scribing and splitting | see FIG. 11 |
| precision edge surface process | grinding material: diamond whetstone |
| edge surface polishing process | polishing material: cerium oxide |
| second lapping | device: double-surface lapping board manufactured by Hamai Company Limited grinding material: diamond pellets |
| polishing  first | device: double-surface polishing board manufactured by Hamai Company Limited polishing material: cerium oxide |
|  second | device: double-surface polishing board manufactured by Hamai Company Limited polishing material: cerium oxide [glass substrate after second polishing] outer periphery diameter: 65 mm, inner periphery diameter of hole: 20 mm, thickness: 635 μm |
| washing | pure water ultrasonic washing, device: Sonic Fellow Co., Ltd. |

Example B2

A glass substrate provided with a center hole was manufactured in the same manner as in Example B1 except for the usage of the device of FIG. 9 provided with the following protruding portion and except for the compression of glass so that D becomes 0.28 T1. The gained glass substrate had an outer periphery diameter of 67 mm, an inner periphery diameter of the hole of 19 mm and a thickness of 1800 μm.

(protruding portion) in the form of a curved-type circular truncated cone (see FIG. 10(A)) wherein B/A=0.9, H=1.3 mm and the material is cemented carbide alloy.

Example B3

A glass substrate provided with a center hole was manufactured in the same manner as in Example B1 except for the usage of the device of FIG. 9 provided with the following protruding portion and except for the compression of glass so that D becomes 0.3 T1. The gained glass substrate had an outer periphery diameter of 67 mm, an inner periphery diameter of the hole of 19 mm and a thickness of 1300 μm.

(protruding portion) in the form of a two-stage linear-type circular truncated cone (see FIG. 10(B)) wherein B/A=0.9, H=0.9 mm and the material is cemented carbide alloy.

Comparison Example B1

Though it was attempted to manufacture a glass substrate provided with a center hole in the same manner as in Example B1 except for the usage of the device of FIG. 9 provided with the following protruding portion, the upper mold did not easily come off the glass substrate at the time of press molding and this substrate was deformed.

(protruding portion) in the form of a column wherein B/A=1.00, H=1.3 mm and the material is cemented carbide alloy.

Comparison Example B2

Though it was attempted to manufacture a glass substrate in the same manner as in Example B1, except for the compression of glass so that D becomes 0.05 T1, the substrate cracked in the cooling step immediately after molding.

Experimental Example C

Glass substrates were manufactured under the conditions shown in the following table according to the flow charts shown in FIGS. 14 and 15.

Example C1

3000 glass substrates having diameters of 65 mm were manufactured according to the flow chart of FIG. 14. The values concerning the glass substrates in the table, other than the thickness dispersion, indicate average values. The respective values concerning the glass substrates after the second polishing can be regarded as the values of the glass substrates ultimately gained.

Example C2

Glass substrates were manufactured according to the flow chart of FIG. 15. Here, the amount of melted glass made to flow into the lower mold was increased and decreased within a range wherein the outer periphery portion of the glass did not make contact with a parallel spacer at the time of press molding and 1000 substrates having a diameter of 30 mm, 1000 substrates having a diameter of 50 mm, 1000 substrates having a diameter of 67 mm, 1000 substrates having a diameter of 78 mm, 1000 substrates having a diameter of 86 mm and 1000 substrates having a diameter of 97 mm, respectively, were manufactured. The values concerning the glass substrates in the table, other than the thickness dispersion, indicate average values.

TABLE 6

Flow Chart of FIG. 14

| Step | Conditions |
|---|---|
| melting of glass | type of glass: lithium aluminosilicate glass (Tg: 500° C.) |
| press molding | [device conditions] device of FIG. 6 (material of upper mold, lower mold and parallel spacers is cemented carbide alloy: surfaces of parallel spacers that make contact with the upper mold and the lower mold, surfaces of the upper mold and the lower mold that make contact with the parallel spacers and the molding surfaces of the upper mold and the lower mold have a parallelism of 2 μm, a flatness of 2 μm, a surface coarseness of 1 μm and a maximum surface coarseness of 6 μm) [molding conditions] pressure for press molding: 50 kg/cm$^2$, period of time of pressing: 1.5 seconds |
| crystallization | setter material units (flatness: 2 μm, surface coarseness: 0.2 μm), maximum heating temperature: 700° C. [glass substrate after cooling] parallelism: 8 μm, flatness: 8 μm, thickness: 1200 μm, thickness dispersion ±5 μm, surface coarseness 1 μm, maximum surface coarseness: 6 μm |
| coring | device: coring device manufactured by Nakamura-Tome Precision Industry Co., Ltd. |

TABLE 7

| | | |
|---|---|---|
| precision edge surface process | | grinding material: diamond whetstone |
| edge surface polishing process | | polishing material: cerium oxide |
| lapping | | device: double-surface lapping board manufactured by Hamai Company Limited grinding material: diamond pellets amount of grinding (thickness direction): 160 μm |
| polishing | first | device: double-surface polishing board manufactured by Hamai Company Limited polishing material: cerium oxide |
| | second | device: double-surface polishing board manufactured by Hamai Company Limited polishing material: cerium oxide [glass substrate after second polishing] parallelism: 2 μm, flatness: 2 μm, thickness: 1000 μm, thickness dispersion: ±2 μm, surface coarseness: 0.5 nm, maximum surface coarseness: 20 nm |
| washing | | pure water ultrasonic washing, device: Sonic Fellow Co., Ltd. |

TABLE 8

Flow Chart of FIG. 15

| Step | Conditions |
|---|---|
| melting of glass | type of glass: lithium aluminosilicate glass (Tg: 500° C.) |
| press molding | [device conditions] device of FIG. 6 (material of upper mold, lower mold and parallel spacers is cemented carbide alloy: surfaces of parallel spacers that make contact with the upper mold and the lower mold, surfaces of the upper mold and the lower mold that make contact with the parallel spacers and the molding surfaces of the upper mold and the lower mold have a parallelism of 2 μm, a flatness of 2 μm, a surface coarseness of 0.5 μm and a maximum surface coarseness of 3 μm)<br>[molding conditions] pressure for press molding: 50 kg/cm², period of time of pressing: 1.5 seconds |
| annealing | setter material units (flatness: 2 μm, surface coarseness: 0.2 μm), maintaining temperature (Tg + 20)° C., maintenance for five hours, cooling: gradual cooling to 10° C./h to (Tg − 150)° C., subsequently left to cool<br>[glass substrate after cooling] parallelism: 5 μm, flatness: 5 μm, thickness: 1040 μm, thickness dispersion ±5 μm, surface coarseness 0.5 μm, maximum surface coarseness: 3 μm |
| coring | device: coring device manufactured by Nakamura-Tome Precision Industry Co., Ltd. |

TABLE 9

| | | |
|---|---|---|
| precision edge surface process | | grinding material: diamond whetstone |
| edge surface polishing process | | polishing material: cerium oxide |
| polishing | first | device: double-surface polishing board manufactured by Hamai Company Limited<br>polishing material: cerium oxide |
| | second | device: double-surface polishing board manufactured by Hamai Company Limited<br>polishing material: cerium oxide<br>[glass substrate after second polishing] parallelism: 2 μm, flatness: 2 μm, thickness: 1000 μm, thickness dispersion: ±2 μm, surface coarseness: 0.5 nm, maximum surface coarseness: 20 nm |
| washing | | pure water ultrasonic washing, device: Sonic Fellow Co., Ltd. |

Comparison Example C1

It was attempted to manufacture a glass substrate in the same manner as in the manufacturing method for a glass substrate in Example C1, except for an increase in the amount of melted glass made to flow into the lower mold so that the outer portion of the glass made contact with a parallel spacer at the time of press molding.

Figure 18:
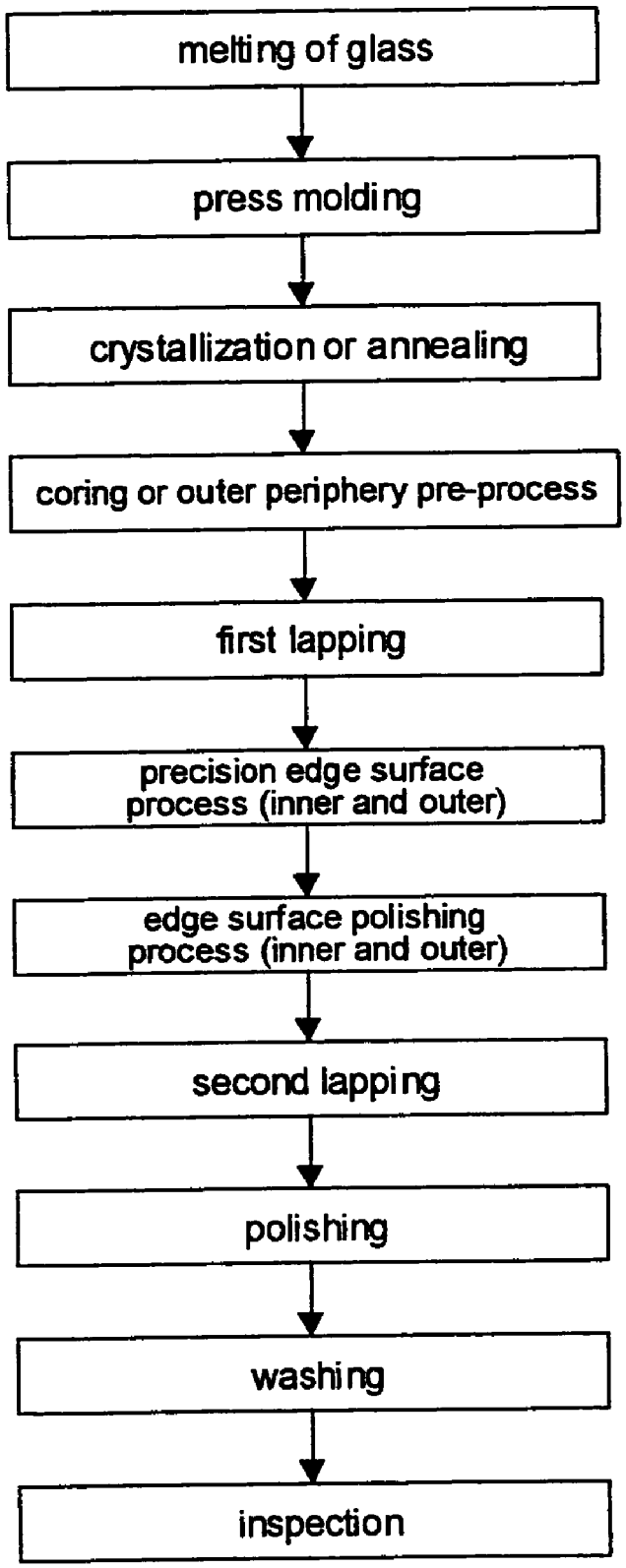
FIG. 18 is a flow chart of a manufacturing method for a glass substrate of a hard disk according to a prior art.

However, a glass substrate immediately after the crystallization process had a parallelism of 50 μm, a flatness of 50 μm, a thickness of 13000 μm, a thickness dispersion of ±100 μm and, therefore, the conventional first lapping step could not be omitted and, consequently, a glass substrate having a parallelism of 3 μm, a flatness of 3 μm, a thickness of 635 μm, a thickness dispersion of +10 μm, a surface coarseness of 0.5 nm and maximum surface coarseness of 20 nm was manufactured according to the flow chart shown in FIG. 18.

It can be seen from the above result that it was difficult in Comparison Example C1 to gain a glass substrate having the same degree of parallelism, flatness, thickness dispersion, surface coarseness and maximum surface coarseness as of those in the example and the manufacturing cost of Comparison Example C1 was great because of the great number of steps.

In the above described examples, at least the step corresponding to the first lapping step of the conventional flow chart in FIG. 18, preferably, the steps corresponding to the first lapping step and the second lapping step of the conventional flow chart can be omitted so that the manufacturing cost can be greatly reduced.

What is claimed is:

1. A manufacturing method for a glass substrate, comprising the steps of:
melting a glass material;
flowing the melted glass into a lower mold;
press molding the glass between an upper mold and the lower mold into a glass substrate;
detecting the center of gravity of the glass substrate; and
creating a center hole so that the center of gravity becomes the center of the center hole.

2. A manufacturing method according to claim 1, wherein the center of gravity is detected by carrying out image processing on a two dimensional image as viewed from the direction of the thickness of the glass substrate.

* * * * *